(12) United States Patent
He et al.

(10) Patent No.: US 12,206,605 B2
(45) Date of Patent: Jan. 21, 2025

(54) SELECTING UNIFIED TRANSMISSION STATES FOR MULTIPOINT OPERATION USING IDENTIFIED LISTS

(71) Applicant: Apple Inc., Cupertino, CA (US)

(72) Inventors: Hong He, Cupertino, CA (US); Dawei Zhang, Saratoga, CA (US); Wei Zeng, San Diego, CA (US); Haitong Sun, Cupertino, CA (US); Ankit Bhamri, Bad Nauheim (DE); Chunxuan Ye, San Diego, CA (US); Sigen Ye, San Diego, CA (US); Oghenekome Oteri, San Diego, CA (US); Seyed Ali Akbar Fakoorian, San Diego, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 17/883,465

(22) Filed: Aug. 8, 2022

(65) Prior Publication Data
US 2024/0048302 A1    Feb. 8, 2024

(51) Int. Cl.
*H04L 5/00*    (2006.01)
*H04W 72/23*    (2023.01)

(52) U.S. Cl.
CPC .......... *H04L 5/0035* (2013.01); *H04L 5/0053* (2013.01); *H04W 72/23* (2023.01)

(58) Field of Classification Search
None
See application file for complete search history.

(56) References Cited

U.S. PATENT DOCUMENTS

| | | |
|---|---|---|
| 2020/0107352 A1 | 4/2020 | Tsai |
| 2021/0112583 A1 | 4/2021 | Gao |
| 2022/0247538 A1 | 8/2022 | Farag |
| 2023/0050480 A1 | 2/2023 | Zhu |
| 2023/0216565 A1 | 7/2023 | Kwak |
| 2023/0239885 A1 | 7/2023 | Khoshnevisan |
| 2023/0254097 A1 | 8/2023 | Zhou |
| 2023/0262703 A1 | 8/2023 | Chen |
| 2023/0370238 A1 | 11/2023 | Liu |
| 2024/0089974 A1 | 3/2024 | Yu |
| 2024/0107612 A1 | 3/2024 | Nilsson |
| 2024/0195573 A1 | 6/2024 | Liu |

OTHER PUBLICATIONS

International Search Report for PCT/US2023/029312; Nov. 15, 2023.
International Search Report for PCT/US2023/029313; Nov. 15, 2023.
Futurewei "Unified TCI framework extension for multi-TRP"; 3GPP TSG RAN WG1 Meeting #109-e R1-2203061; May 9, 2022.

(Continued)

*Primary Examiner* — Walter J Divito
(74) *Attorney, Agent, or Firm* — Kowert, Hood, Munyon, Rankin & Goetzel, P.C.

(57) ABSTRACT

This disclosure relates to techniques for performing multi-transmission and reception point operation in a wireless communication system. A plurality of transmission control indication states may be indicated for future use, e.g., using one or more separately identified lists. A subset of the indicated states may be activated. One or more states of the subset may be used for performing multi-transmission and reception point operation in a single downlink control information mode.

20 Claims, 11 Drawing Sheets

(56) References Cited

OTHER PUBLICATIONS

VIVO "Views on unified TCI framework extension for muli-trp"; 3GPP TSG RAN WG1 Meeting #109-e R1-2203541; May 9, 2022.
3GPP TS 38.321 V17.1.0, 3rd Generation Partnership Project; Technical Specification Group Radio Access Network; NR; Medium Access Control (MAC) protocol specification (Release 17), pp. 1-241; Jun. 2022.

| R | Serving cell ID | | | | | DL BWP ID |
|---|---|---|---|---|---|---|
| R | R | R | R | R | R | UL BWP ID |
| $P_1$ | | $P_2$ | | $P_3$ | | $P_4$ |
| $P_5$ | | $P_6$ | | $P_7$ | | $P_8$ |
| D/U | TCI state ID 1 | | | | | |
| D/U | TCI state ID 2 | | | | | |
| D/U | TCI state ID 3 | | | | | |
| D/U | TCI state ID 4 | | | | | |

| D/U | TCI state ID N |
|---|---|

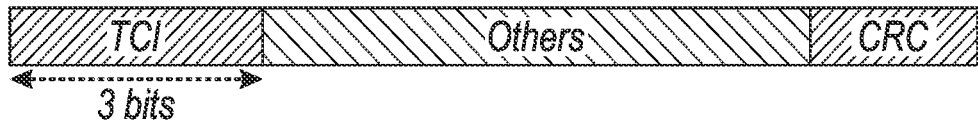
FIG. 10
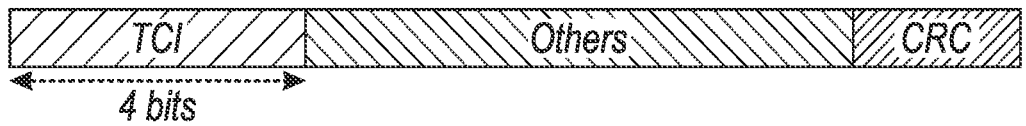
FIG. 11
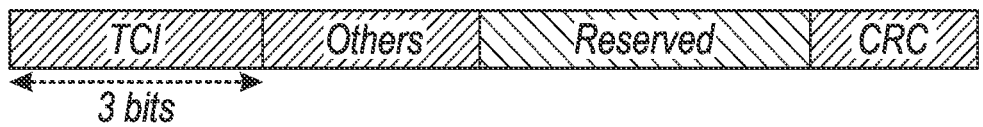
FIG. 12
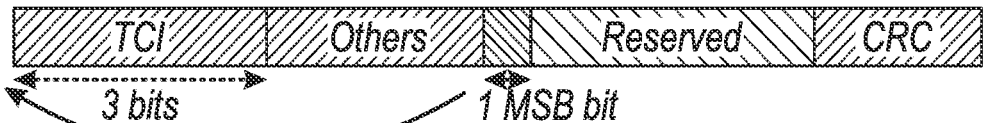
FIG. 13
| R | Serving cell ID | | | | | DL BWP ID | | Oct 1 |
|---|---|---|---|---|---|---|---|---|
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| $P_9$ | $P_{10}$ | $P_{11}$ | $P_{12}$ | $P_{13}$ | $P_{14}$ | $P_{15}$ | $P_{16}$ | Oct 4 |
| D/U | TCI state ID 1 | | | | | | | |
| D/U | TCI state ID 2 | | | | | | | |
| D/U | TCI state ID 3 | | | | | | | |
| D/U | TCI state ID 4 | | | | | | | |
- - - - - - - - -
| D/U | TCI state ID N | Oct N+4 |
|---|---|---|
FIG. 14

| TRP ID | Serving cell ID | | | | | DL BWP ID | | Oct 1 |
|---|---|---|---|---|---|---|---|---|
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| D/U | TCI state ID 1 | | | | | | | |
| D/U | TCI state ID 2 | | | | | | | |
| D/U | TCI state ID 3 | | | | | | | |
| D/U | TCI state ID 4 | | | | | | | |
| — | — | — | — | — | — | — | — | |
| D/U | TCI state ID N | | | | | | | Oct N+3 |
FIG. 16
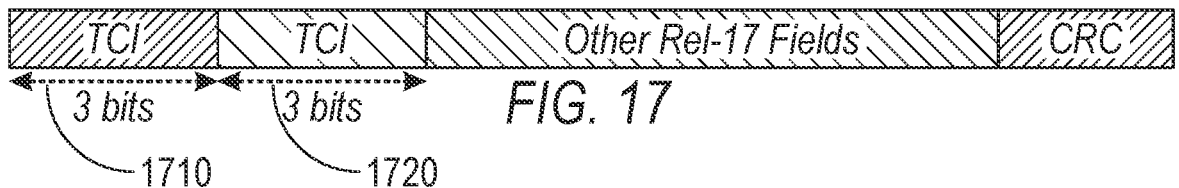
FIG. 17
FIG. 18
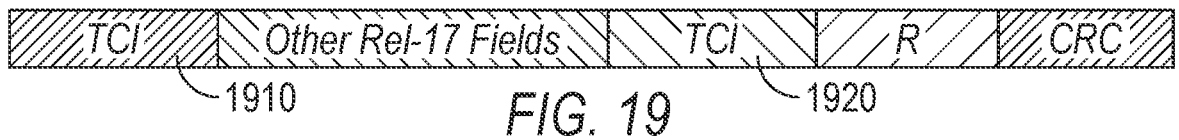
FIG. 19
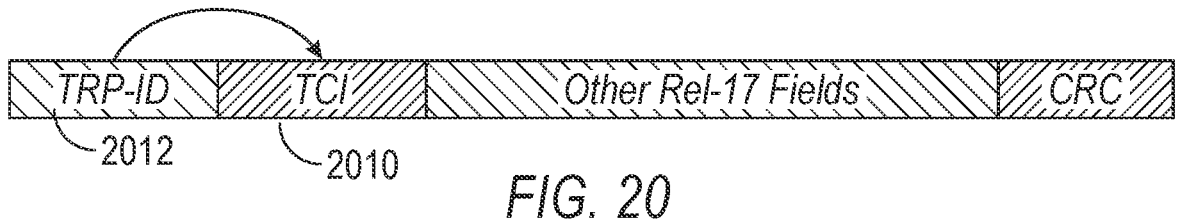
FIG. 20

*Corresponding to TCI state field in DL DCI 1_1 or 1_2*

| D/U | Serving cell ID | | | | | DL BWP ID | | Oct 1 |
|---|---|---|---|---|---|---|---|---|
| $P_1$ | $P_2$ | $P_3$ | $P_4$ | $P_5$ | $P_6$ | $P_7$ | $P_8$ | Oct 2 |
| List ID | | TCI state ID 1 | | | | | | |
| List ID | | TCI state ID 2 | | | | | | |
| List ID | | TCI state ID 3 | | | | | | |
| List ID | | TCI state ID 4 | | | | | | |
| | | — — — — — — — — | | | | | | |
| List ID | | TCI state ID N | | | | | | Oct N+2 |

Referring to DL TCI state

FIG. 24

SRI field in UL DCI 0_1 or 0_2

| D/U | Serving cell ID | | | | | UL BWP ID | | Oct 1 |
|---|---|---|---|---|---|---|---|---|
| $P_1$ | $P_2$ | $P_3$ | $P_4$ | $P_5$ | $P_6$ | $P_7$ | $P_8$ | Oct 2 |
| List ID | | TCI state ID 1 | | | | | | |
| List ID | | TCI state ID 2 | | | | | | |
| List ID | | TCI state ID 3 | | | | | | |
| List ID | | TCI state ID 4 | | | | | | |
| | | — — — — — — — — | | | | | | |
| List ID | | TCI state ID N | | | | | | Oct N+2 |

Referring to UL TCI state

FIG. 25

SELECTING UNIFIED TRANSMISSION STATES FOR MULTIPOINT OPERATION USING IDENTIFIED LISTS

FIELD

The present application relates to wireless communications, and more particularly to systems, apparatuses, and methods for communication using unified transmission control states for multi-transmission-reception-point operation in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for communication using unified transmission control states for multi-transmission-reception-point operation in a wireless communication system.

One set of embodiments may include a method, by a user equipment (UE). The method may include receiving, from a cellular network, configuration of a plurality of transmission control indication (TCI) states associated with a plurality of transmission and reception points (TRPs). The configuration may comprise: a first pair of lists, comprising: a first list of TCI states; and a second list of TCI states; a second pair of lists, comprising: a third list of TCI states; and a fourth list of TCI states. The method may further comprise receiving, from the cellular network, a first message specific to the first pair of lists indicating a first subset of the plurality of TCI states; and determining, based on the first message, a first association between respective TCI codepoints and respective TCI states according to the first pair of lists. The method may further comprise receiving, from the cellular network, a second message indicating a first TCI codepoint. The method may further comprise selecting, based on the first TCI codepoint and the first association between respective TCI codepoints and respective TCI states: a first TCI state from the first list; and a second TCI state from the second list. The method may further comprise communicating with the cellular network via the first TRP using the first TCI state and the second TCI state.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings.

FIGS. 6-25 illustrate exemplary aspects of various possible approaches to communication using unified transmission control states for multi-TRP operation in a wireless communication system, according to some embodiments.

Figure 1:
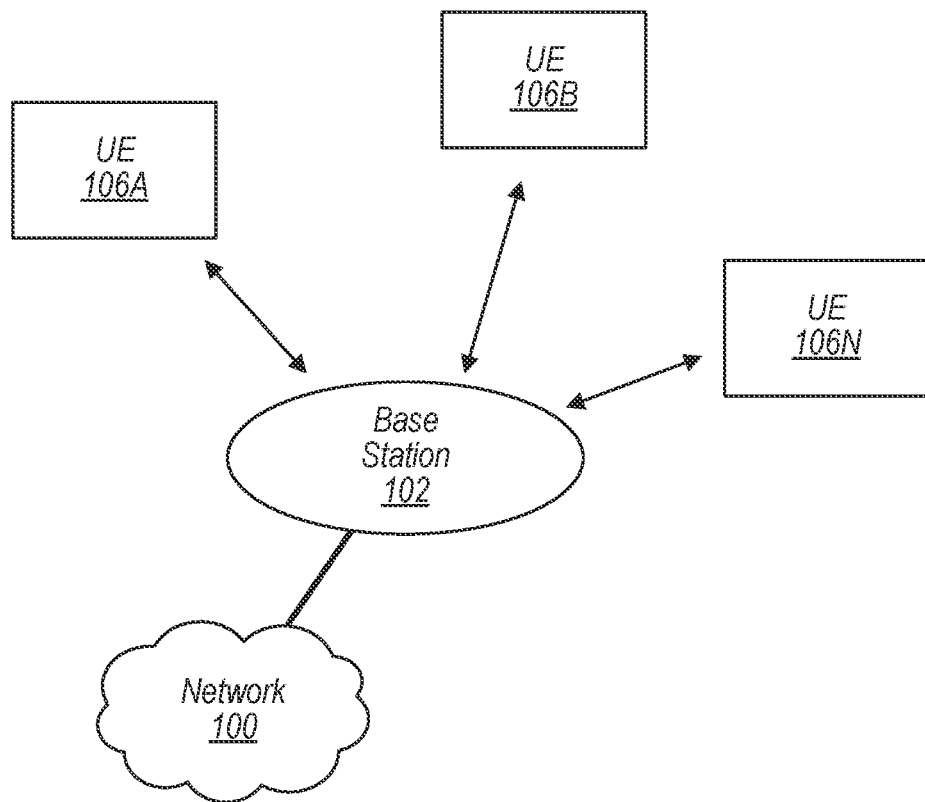
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
PDCCH: Physical Downlink Control Channel
TRP: Transmission-Reception-Point
TCI: Transmission Control Indicator
QCL: Quasi-co-located
DCI: Downlink Control Information
CSI: Channel State Information
CQI: Channel Quality Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
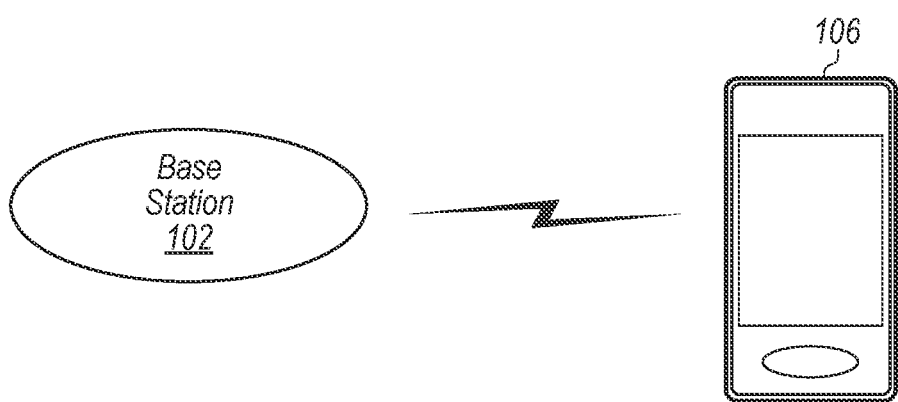
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for communication using unified TCI states for multi-TRP operation in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

In some embodiments, the UE 106 may include multiple subscriber identity modules (SIMs, sometimes referred to as SIM cards). In other words, the UE 106 may be a multi-SIM (MUSIM) device, such as a dual-SIM device. Any of the various SIMS may be physical SIMs (e.g., SIM cards) or embedded (e.g., virtual) SIMs. Any combination of physical and/or virtual SIMS may be included. Each SIM may provide various services (e.g., packet switched and/or circuit switched services) to the user. In some embodiments, UE 106 may share common receive (Rx) and/or transmit (Tx) chains for multiple SIMs (e.g., UE 106 may have a dual SIM dual standby architecture). Other architectures are possible. For example, UE 106 may be a dual SIM dual active architecture, may include separate Tx and/or Rx chains for the various SIMs, may include more than two SIMs, etc.

The different identities (e.g., different SIMs) may have different identifiers, e.g., different UE identities (UE IDs). For example, an international mobile subscriber identity (IMSI) may be an identity associated with a SIM (e.g., in a MUSIM device each SIM may have its own IMSI). The IMSI may be unique. Similarly, each SIM may have its own unique international mobile equipment identity (IMEI). Thus, the IMSI and/or IMEI may be examples of possible UE IDs, however other identifiers may be used as UE ID.

The different identities may have the same or different relationships to various public land mobile networks (PLMNs). For example, a first identity may have a first home PLMN, while a second identity may have a different home PLMN. In such cases, one identity may be camped on a home network (e.g., on a cell provided by BS 102) while another identity may be roaming (e.g., while also camped on the same cell provided by BS 102, or a different cell provided by the same or different BS 102). In other circumstances, multiple identities may be concurrently home (e.g., on the same or different cells of the same or different networks) or may be concurrently roaming (e.g., on the same or different cells of the same or different networks). As will be appreciated, numerous combinations are possible. For example, two SIM subscriptions on a MUSIM device may belong to the same equivalent/carrier (e.g., AT&T/AT&T or CMCC/CMCC). As another exemplary possibility, SIM-A may be roaming into SIM-B's network (SIM-A CMCC user roaming into AT&T and SIM-B is also AT&T).

Figure 3:
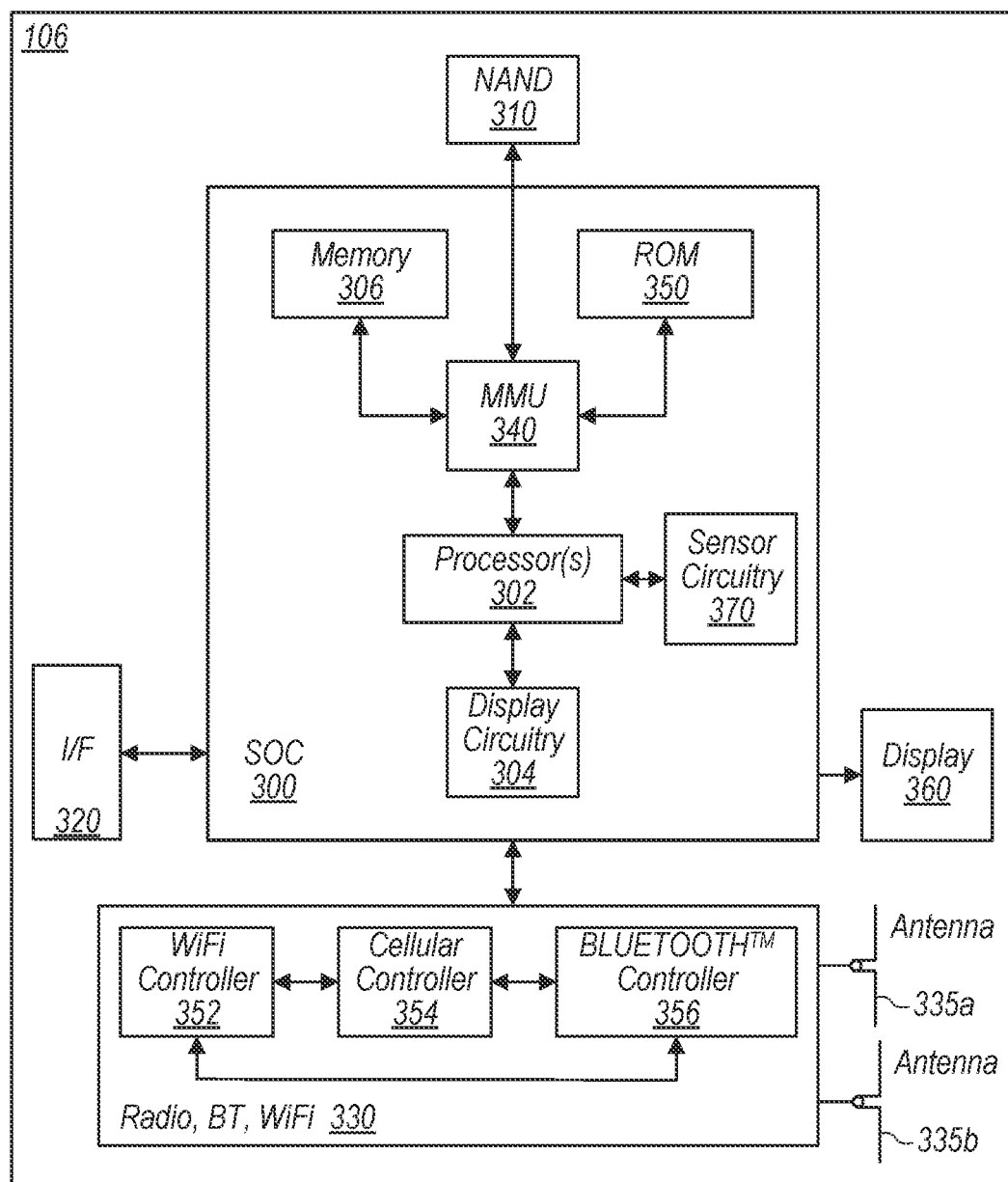
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for communication using unified TCI states for multi-TRP operation in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for communication using unified TCI states for multi-TRP operation in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
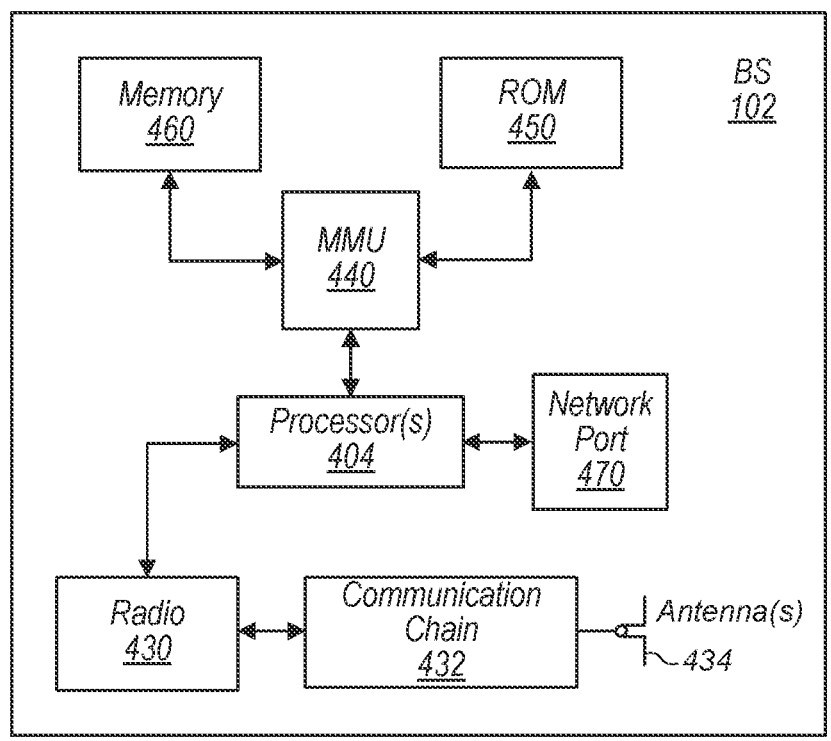
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404.

In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource indicator (CRI), a SSBRI (SS/PBCH Resource Block Indicator, and a Layer Indicator (LI), at least according to some embodiments.

The channel quality information may be provided to the base station for link adaptation, e.g, for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the TIE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the LTE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RD)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
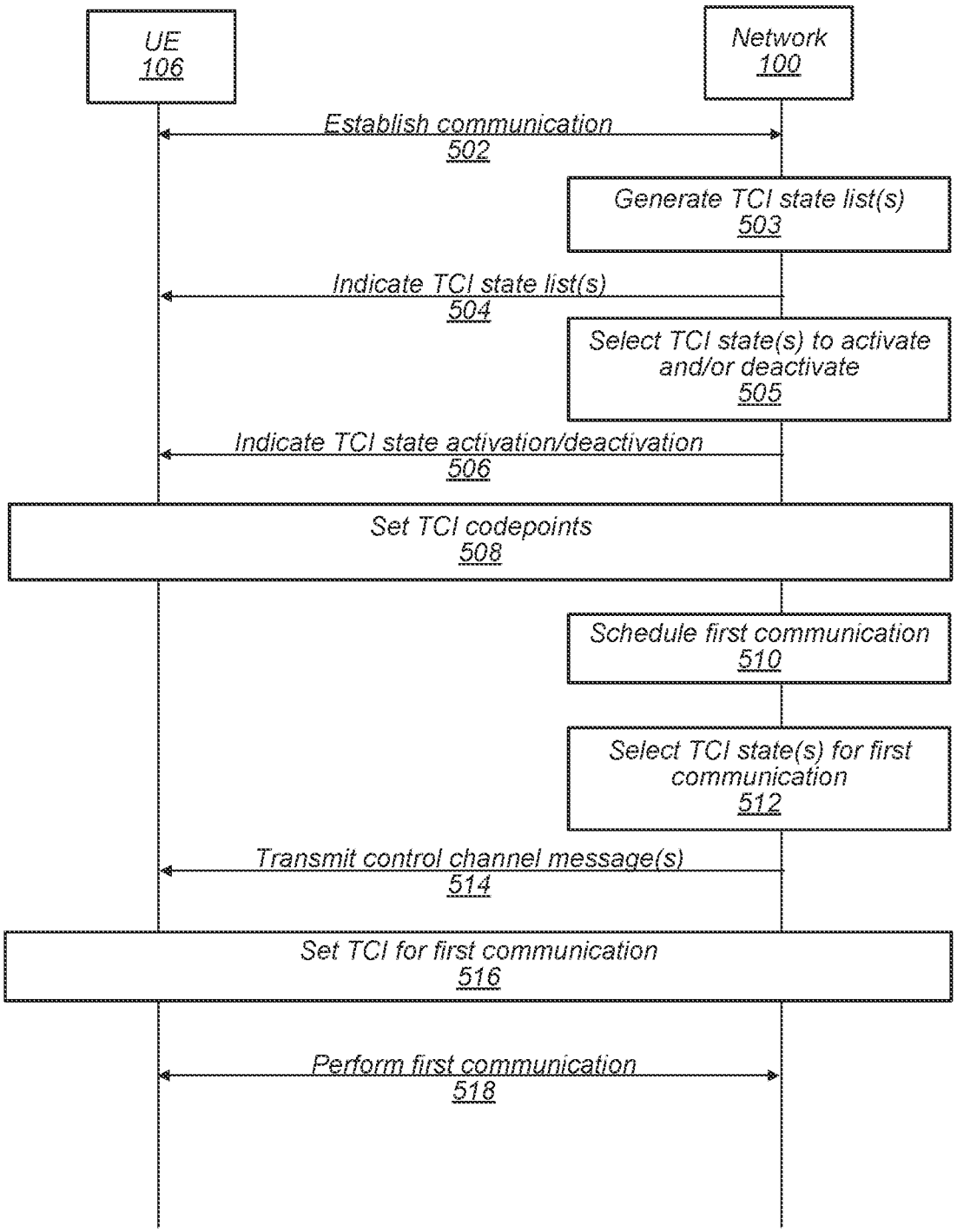
FIG. 5 is a communication flow diagram illustrating aspects of an exemplary possible method for communication using unified transmission control states for multi-TRP operation in a wireless communication system, according to some embodiments.

FIG. 5—Mapping TCI States for Multi-TRP Operation

According to some cellular communication technologies, it may be possible for a UE to communicate with multiple transmission-reception-points (TRPs), including potentially simultaneously. Such communication can be scheduled using downlink control information (DCI), which may be provided using control signaling such as on a physical downlink control channel (PDCCH) that may be transmitted in one or more control resource sets (CORESETs) and/or search space sets (SSSs). The DCI may be provided in a single DCI (sDCI) mode, in which communications between multiple TRPs (mTRP) and a wireless device/UE may be scheduled using a single DCI communication (e.g., from just one TRP), or in a multi-DCI mode, in which each of multiple TRPs may provide DCI communications scheduling their own communications with a wireless device.

The communications that are scheduled in such a multi-TRP scenario may include data communications (e.g., which may be transmitted using a physical downlink shared channel (PDSCH) and/or a physical uplink shared channel (PUSCH), and/or aperiodic channel state information reference signal (CSI-RS) transmissions, among various possibilities. Further, aperiodic CSI-RS transmissions can include CSI-RS that are configured for multiple possible purposes, such as for beam management, tracking, or CSI acquisition.

Transmission to/from a UE from/to a TRP may be directed according to a transmission control indication (TCI) state. For example, a TCI state may correspond to an uplink (UL) and/or downlink (DL) beam at the UE and/or TRP. A UE may be configured to use one or more TCI states simultaneously. A few years after the first deployment of NR, it is becoming clear that the TCI state framework in Release 15 (Rel-15) may be considered overly flexible, which may lead to a significant signaling overhead. A unified TCI framework was introduced in Rel-17 which may facilitate streamlined multi-beam operation, e.g., for use with frequency range (FR) 2. According to the unified TCI framework, one TCI state indication may apply to multiple channels (e.g., PDSCH, PUSCH, PDCCH, and PUCCH may all be mapped to a single common TCI state).

A TCI state may be one of three types: uplink (e.g., only), downlink, or joint (e.g., bi-directional, e.g., uplink and downlink).

One objective of various technical efforts may be to enhance the unified TCI framework to allow for extension to mTRP use cases. The Rel-17 unified TCI framework may support cases where all uplink and downlink signals/channels use the same beam or TCI. Similarly, the Rel-17 unified TCI framework may support cases where all uplink signals/channels use one beam/TCI and all downlink signals/channels use a second beam/TCI. However, the Rel-17 unified TCI framework may not support mTRP cases, e.g., where all uplink or downlink signals/channels do not use the same beam/TCI.

One potential issue to be addressed for extending unified TCI framework to mTRP is how to indicate multiple (e.g., potentially more than 2) TCI states to enable more flexible communication between a UE and multiple TRPs. Thus, it may be beneficial to specify techniques for activating and/or deactivating TCI states in a multi-TRP scenario. To illustrate one such set of possible techniques, FIG. 5 is a flowchart diagram illustrating a method for performing TCI state indication for multi-TRP operation in a wireless communication system, at least according to some embodiments. Aspects of the method of FIG. 5 may allow the UE and network to each determine the same TCI state(s) and/or TCI codepoints for communication. The method of FIG. 5 may be useful in sDCI mTRP scenarios, among various possibilities.

Aspects of the method of FIG. 5 may be implemented by a wireless device, e.g., in conjunction with one or more cellular base stations and/or TRPs, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular network (502), according to some embodiments. According to some embodiments, the wireless link may include a cellular link according to 5G NR. For example, the UE may establish a session with an AMF entity of the cellular network by way of one or more base stations (e.g., TRPs and/or gNBs) that provide radio access to the cellular network. As another possibility, the wireless link may include a cellular link according to LTE. Other types of cellular links are also possible, and the cellular network may also or alternatively operate according to another cellular communication technology (e.g., UMTS, CDMA2000, GSM, etc.), according to various embodiments.

Establishing the wireless link may include establishing a radio resource control (RRC) connection with a serving cellular base station, at least according to some embodiments. Establishing the RRC connection may include configuring various parameters for communication between the UE and the cellular base station, establishing context information for the UE, and/or any of various other possible features, e.g., relating to establishing an air interface for the UE to perform cellular communication with a cellular network associated with the cellular base station. After establishing the RRC connection, the UE may operate in a RRC connected state. In some instances, the RRC connection may also be released (e.g., after a certain period of inactivity with respect to data communication), in which case the UE may operate in a RRC idle state or a RRC inactive state. In some instances, the UE may perform handover (e.g., while in RRC connected mode) or cell re-selection (e.g., while in RRC idle or RRC inactive mode) to a new serving cell, e.g., due to UE mobility, changing wireless medium conditions, and/or for any of various other possible reasons.

At least according to some embodiments, the UE may establish multiple wireless links, e.g., with multiple TRPs of the cellular network, according to a multi-TRP configuration.

At least in some instances, establishing the wireless link(s) may include the UE providing capability information for the UE. Such capability information may include information relating to any of a variety of types of UE capabilities. At least in some instances, establishing the wireless link(s) may include the UE exchanging configuration information with the network. Among various possibilities, the configuration information and/or capability information may include information related to indication (e.g., activation, deactivation, and/or selection) of one or more TCI state for communication.

The network may generate one or more lists of TCI states and/or groups of TCI states (503), according to some embodiments. Such a list or lists may describe the possible TCI states and/or groups of TCI states that the UE may use for communicating with the network, e.g., via any number of TRPs. The different TRPs may belong to the same or different serving cells. The TCI states may include UL only TCI states, DL only TCI states, and/or joint (e.g., UL and DL) TCI states. Any of the TCI states may be unified TCI states. TCI states may be grouped in any of various ways.

The TCI states on a list may be identified with index values, e.g., with TCI state identifiers (IDs). For example, a list of 64 TCI states may be indexed from 0 to 63.

In some embodiments, each list may be associated with a TCI list ID.

As one possibility, the network may generate one or more common TCI state lists for multiple TRPs. For example, one common list may be a DL/joint TCI state list. Such a DL/joint list may consist of a number DL and/or joint TCI states. Further, another common list may be a UL TCI state list consisting of a number of UL only TCI states. The common lists may include states associated with any number of different TRPs.

In some embodiments, one common list may be UL and/or joint TCI states and another common list may be DL TCI states. Similarly, three different common lists (e.g., one each for UL, DL, and joint) may be used.

In some embodiments, a maximum number of DL/joint TCI states in the list may be extended from 128 in Rel-17 to 256 to support mTRPs. Similarly, a maximum number of UL TCI states in the list may be extended from 64 in Rel-17 to 128. Other maximum numbers may be used as desired.

In some embodiments, the network may generate groups of TCI states from the list(s). For example, one or more groups may be generated from a DL/joint common list and one or more groups may be generated from a UL common list. As one possibility, one group may include one TCI state for each of a number of TRPs. For example, in a case with two TRPs, a group may include two TCI states, one for each TRP. In other words, each TCI state group may consist of multiple DL/UL/joint TCI States that are selected from the DL/joint TCI state list and UL TCI state list. Each group may be identified with a group index. The following table provides example TCI group types and explains potential use cases for each group type. Note that, in the example, the groups are indexed with decimal numbers, however each group may be indexed with a binary number (e.g., a group ID of 3 digits in the case that up to 8 groups are configured; however different ID sizes and maximum number of groups may be used as desired) which may be matched to a TCI codepoint in DCI. Table 1:

| Group Index | Description | Example Use Cases |
|---|---|---|
| 1 | <Joint TCI state #1, DL TCI state #2, UL TCI state #2> | A first TRP may be configured with 'joint TCI state' mode and a second TRP is configured with separate DL/UL TCI states. |
| 2 | <DL TCI state #2, DL TCI state #12, UL TCI state #2, UL TCI state #12> | This design may be used when the UE is configured with groupBasedBeamReporting and the network may form a pair of DL/UL beams towards two TRPs, among various possibilities. Note that 'groupBasedBeamReporting' may describe a beam reporting configuration where UE reports a group of beams that can be used simultaneously for DL receptions. |
| 3 | <DL TCI state #2, DL TCI state #12, UL TCI state #13> | One use case is for inter-cell mobility with handover to keep 2 DL receptions from two TRPs and switch the UL transmission from one TRP to the other TRP. |
| 4 | <DL TCI state #2, UL TCI state #2> | This type of group may be used to update a unified TCI for a single TRP without changing a TCI for another TRP. |

In some embodiments, the groups may be created without any restriction, e.g., a group may be created with states from any list or combination of lists.

In some embodiments, the states for individual groups may be taken from only one of the lists. For example, separate lists of DL/joint groups and UL groups may be created. In other words, up to a maximum KD DL TCI state groups may be generated by selecting one or two (or more) DL or joint TCI states selected from the DL or joint TCI state list and up to a maximum Ku UL TCI state pairs where each pair consists of one or more UL TCI states selected from the UL TCI state list. In other words, groups may be created with the restriction that a group may be limited to one direction (e.g., with joint TCI states allowed in groups for one direction, e.g., DL).

Figure 15:
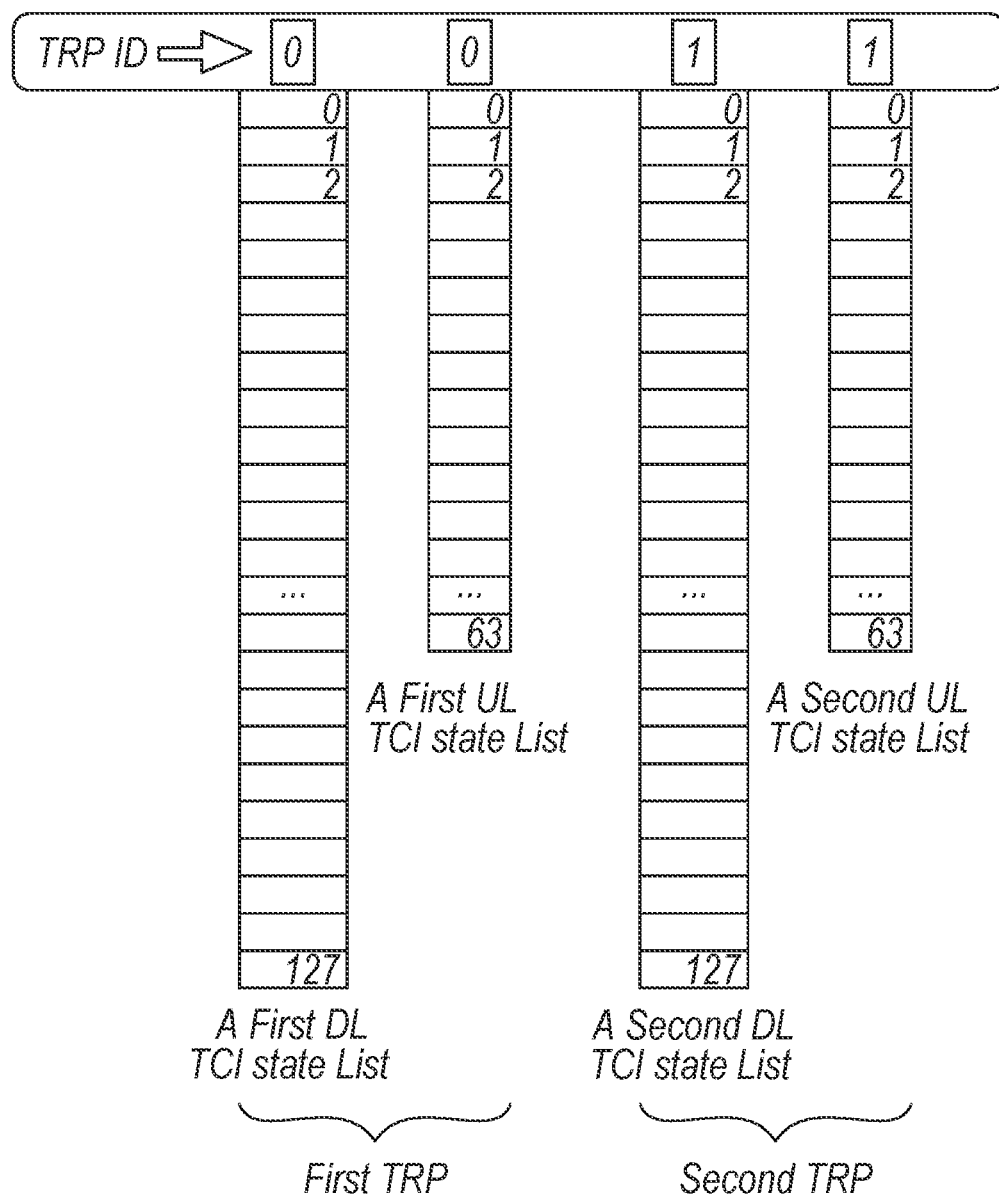

As another possibility, separate lists may be created for separate TRPs. FIG. 15 illustrates DL/joint and UL TCI lists for two TRPs, according to some embodiments. For example, in the case of two TRPs, up to four TCI state lists may be generated as follows. A first DL/joint TCI state list and a first UL TCI state list may be generated for a first TRP (e.g., indicated by TRP ID 0). A second DL/joint TCI state list and a second UL TCI state list may be generated for a second TRP (e.g., TRP ID 1). Note that additional lists may be generated for additional TRPs as desired. A TRP ID may be assigned for each DL/joint TCI state and UL TCI state list.

As another possibility, separate lists may be created for separate resource sets or resource set pools. For example, a first resource set pool may be associated (e.g., using a resource set pool index or ID) with a first DL/joint TCI state list and a first UL TCI state list. Any number of resource sets or resource set pools (e.g., groups of resource sets) may be defined and corresponding lists may be generated for them. Thus, lists similar to those shown in FIG. 15 may be created and identified with resource set or resource set pool IDs (e.g., in place of the TRP IDs shown in FIG. 15.

Figure 21:
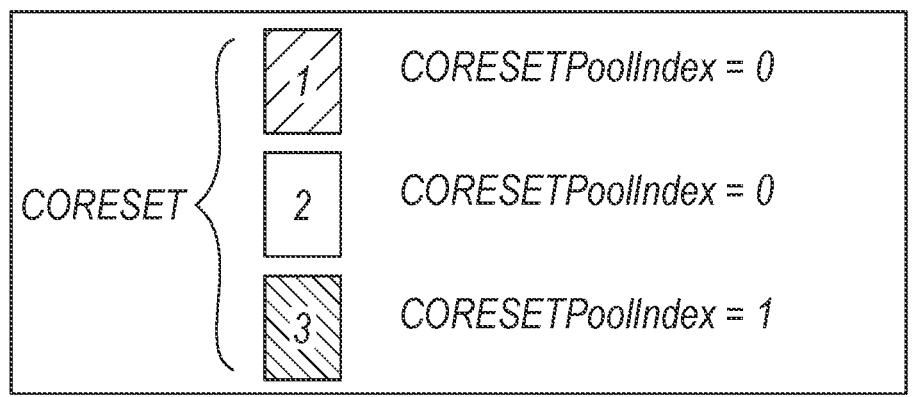
Figure 22:
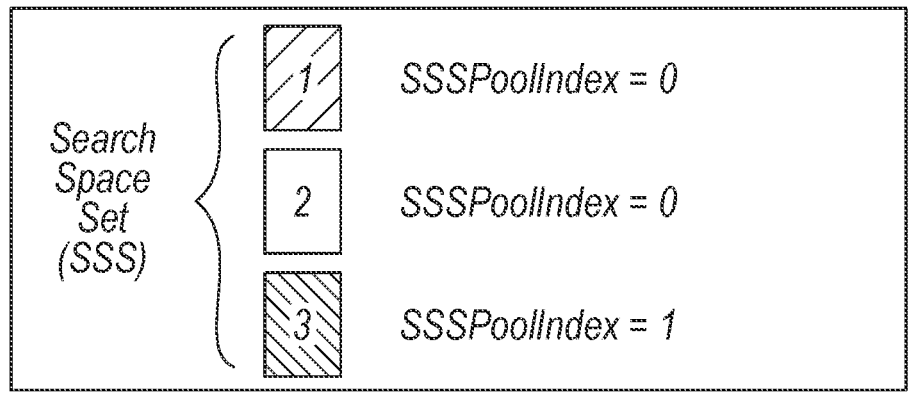

One type of resource set may be a control resource set (CORESET). FIG. 21 illustrates three CORESETs (1-3) grouped into two CORESET pools (e.g., CORESETPoolIndex 0 and 1), according to some embodiments. Another type of resource set may be a search space set (SSS). FIG. 22 illustrates three SSSs (1-3) grouped into two SSS pools (e.g., SSSPoolIndex 0 and 1), according to some embodiments. Thus, TCI state lists may be generated for any number of CORESETs, CORESET pools, SSSs, and/or SSS pools. It will be appreciated that one CORESET may include any number of SSSs. Thus, if a CORESET is associated with a list of TCI states, any SSS in that CORESET may be associated with the list.

The network may transmit the list(s) of TCI states and/or groups of TCI states to the UE (504), according to some embodiments. Further, the network may transmit indication(s) of any of the other information discussed with respect to 503. For example, the network may transmit indication of TRP IDs, groups of TCI states, how different resource sets are grouped into pools, etc. Such list(s) and other information may be provided via RRC, among various possibilities.

In some embodiments, some or all of the information may be transmitted via media access control (MAC) or other signaling, e.g., instead of or in addition to RRC.

Figures 6, 7:
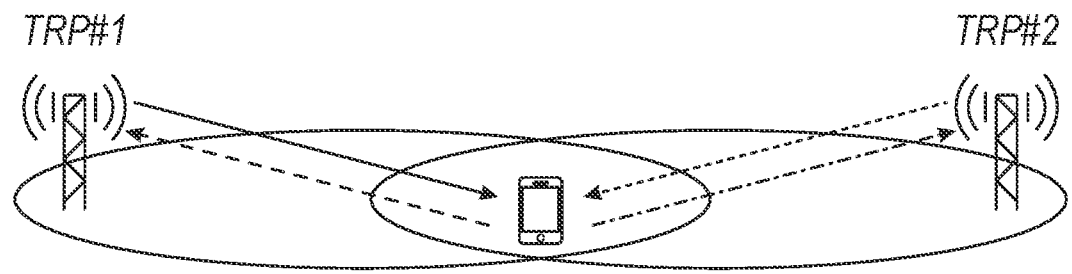

The network may select one or more TCI state(s) (e.g., including one or more groups of TCI states) to activate and/or deactivate for the UE (505), according to some embodiments. For example, one or more TCI state may be activated for each of multiple TRPs, among various possibilities. FIG. 6 illustrates one possibility in which one DL TCI state is activated for TRP #1, a different DL TCI state is activated for TRP #2, and two different UL TCI states are activated (e.g., one each for TRPs 1 and 2). It will be appreciated that additional TRPs may be used as desired. Similarly, joint (e.g., bi-directional) TCIs may be used as desired. Further, only one (e.g., joint/bi-directional or uni-directional) TCI may be used for a TRP.

The selected TCI state(s) (e.g., group(s)) may be a subset of any of the list(s) discussed above with respect to 503 and 504. For example, the network may select a subset of UL TCI states from a list of UL states for one TRP or a list of UL states common to multiple TRPs. As another example, the network may select a plurality of groups of TCI states from a list of groups.

In some embodiments, the network may select one or more TCI state(s) for any resource set or pool of resource sets.

The selected TCI state(s) may be activated or deactivated based on any of various factors including network load (e.g., at any of the relevant TRPs), motion/position of the UE, channel conditions, etc. Different states may be activated/deactivated at different times.

It will be appreciated that a TCI state being activated may not necessarily imply that the TCI state is used for communication between the UE and the network. Instead, an activated TCI state may be associated with one or more TCI codepoint. Accordingly, the network may (e.g., as further described below) select one or more active TCI state to use for communication with the UE at a particular time.

The network may transmit one or more message to the UE to indicate the activation and/or deactivation of the selected TCI state(s) (506), according to some embodiments. Among various possibilities, the message(s) may be or include a media access control (MAC) control element (MAC-CE). For example, a MAC-CE with modifications (e.g., relative to a Rel. 17 unified TCI state activation/deactivation MAC-CE, as discussed below) may be used. In some embodiments, the MAC-CE may be identified with a MAC sub header and a dedicated logical channel ID (LCD).

As one possibility, (e.g., in the case of common TCI state lists for multiple TRPs), a MAC-CE may be modified to allow indication of more than two TCI states for a single TCI codepoint. FIG. 7 illustrates an example, of such a message, according to some embodiments. As shown, the MAC-CE may include a serving cell ID, identifiers of UL and/or DL bandwidth parts (BWP) (e.g., UL/DL BWP ID), and any number of reserved fields (R) (e.g., which may be set to 0). Serving cell ID/DL BWP ID/UL BWP ID may indicates the identity of the serving cell, DL BWP, UL BWP for which the MAC CE applies. The indication of potentially more than two TCI states per codepoint may be achieved by extending each field of a plurality of codepoint specific fields, P, from 1-bit to 'K' bits. A particular field, Pi, may indicate whether a corresponding TCI codepoint has up to 2 K TCI states. As one possibility, if K=2, a field Pi may be interpreted as in the following table, Table 2.

| Value of Pi field (2 bits) | Number of TCI states associated with the i-th TCI codepoint (DL, UL, and/or joint states) |
|---|---|
| 00 | 1 |
| 01 | 2 |
| 10 | 3 |
| 11 | 4 |

As shown in the table, each TCI codepoint may include up to TCI 2 K TCI states. For example, in the case that K=2, as shown, a TCI codepoint may have a maximum of 4 TCI states. As one possibility, a TCI codepoint may indicate 2 DL TCI states (e.g., each corresponding to a TRP) and 2 UL TCI states (e.g., each for a TRP) by setting the Pi field for the codepoint to '11'.

Note that, the up to four TCI state combinations according to a 2-bit field 'Pi' (e.g., in the example that K=2) may at least support the following combinations:
<1 joint TCI state, 1 joint TCI state>
<1 pair of <DL and UL TCI state>, 1 pair of <DL and UL TCI state>>
<1 pair of <DL and UL TCI state>, one DL TCI state>
<1 pair of <DL and UL TCI state>, one UL TCI state>
<1 joint TCI state, 1 pair of <DL and UL TCI state>>.
   Note that this combination may support TRP-specific unified TCI mode configuration. For example, one TRP may be configured with joint TCI mode and another TRP may be configured with separate DL/UL TCI state mode. For example, the second TRP may be configured with different DL and UL TCI states due to a maximum permissible exposure (MPE) issue, among various possibilities.
<1 joint TCI state, 1 DL TCI state>
<1 joint TCI State, 1 UL TCI state>

Further, as shown in FIG. 7, each TCI state ID may be associated with a 1-bit D/U field. This field may indicate whether the TCI State ID in the same octet is a for joint/DL or uplink use. In other words, this field may indicate whether the TCI state ID listed in the octet corresponds to a UL list or to a joint/DL list. As one possibility, the values '0' and '1' may indicate UL and joint/DL TCI state lists, respectively (however, the values may be reversed, as desired).

As shown in FIG. 7, the TCI state IDs may be provided in an ordered list. The Pi field may indicate a number of TCI state IDs (e.g., beginning with the i-th TCI state ID on the list) to associate with the TCI codepoint (e.g., the i-th TCI codepoint) corresponding to the Pi field. For example, P1 may be set to '11' and correspondingly, a first TCI codepoint '000' may be associated with four TCI states which are indicated by TCI state IDs 1, 2, 3, and 4. Similarly, if P5 were set to 01, then TCI codepoint 011 may be associated with two TCI states indicated by TCI state IDs 5 and 6.

Figure 8:
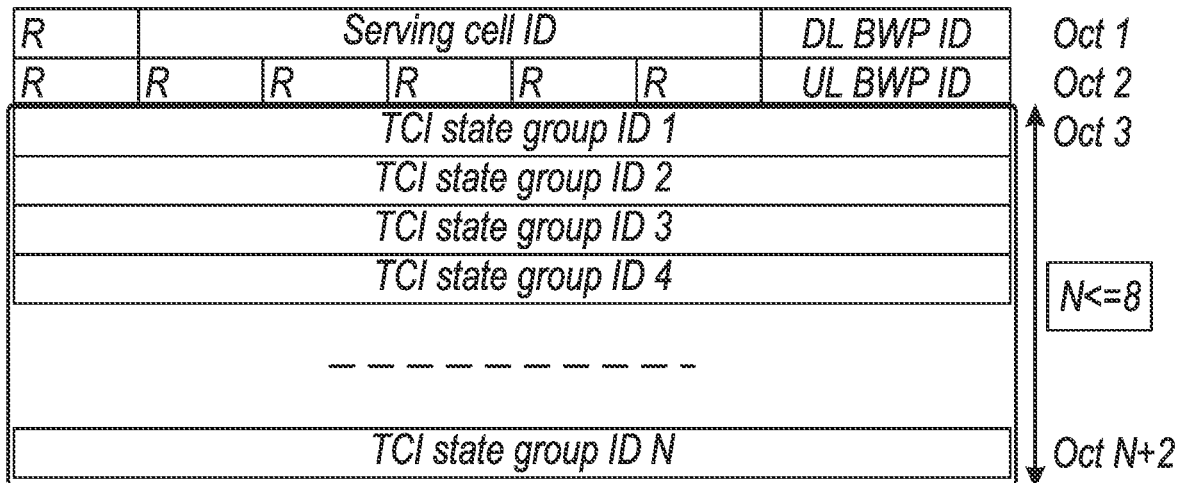

As another possibility, a (e.g., variable size) MAC-CE may be used to activate/deactivate groups of TCI states, e.g., without any restriction on the types of groups created (e.g., in 503, 505). FIG. 8 illustrates an example of such a MAC-CE for activating groups of TCI states, according to some embodiments. Similar to FIG. 7, a serving cell ID, UL and DL BWP IDs may be included, and the MAC-CE may be associated with an LCID. The TCI state group ID fields may indicate the TCI state group index of a group to be activated or remain active. The group index values may refer to any of the groups configured (e.g., in 503/504, e.g., by RRC signaling) previously, for example similar to those shown in Table 1. The first TCI code point (e.g., '000') may be associated with the TCI state group indicated by the 'TCI state group ID 1' field and so on. In some embodiments, the maximum number (N) of activated TCI state groups may be 8.

Figure 9:
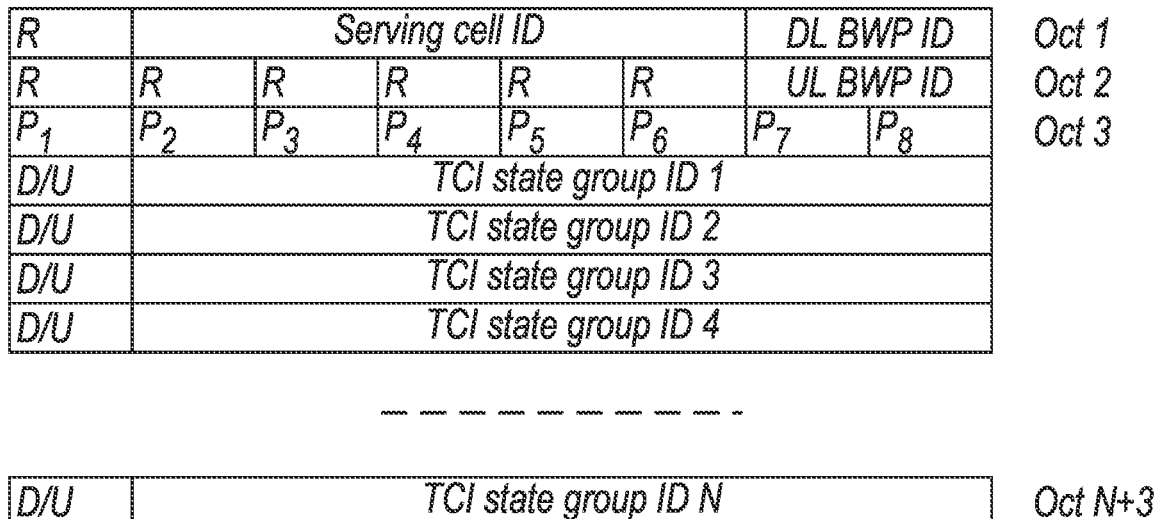

As another possibility, a (e.g., variable size) MAC-CE may be used to activate/deactivate groups of TCI states, e.g., with a restriction on the types of groups created (e.g., in 503, 505). FIG. 9 illustrates an example of such a MAC-CE for activating groups of TCI states, with the restriction that a group is limited to one direction (e.g., with joint TCI states allowed in groups for one direction, e.g., DL), according to some embodiments. Similar to FIG. 7, a serving cell ID, UL and DL BWP IDs may be included, and the MAC-CE may be associated with an LCID. The TCI state group ID fields may indicate the TCI state group index of a group to be activated or remain active. The group index values may refer to any of the groups configured (e.g., in 503/504, e.g., by RRC signaling) previously. The first TCI code point (e.g., '000') may be associated with the TCI state group indicated by the 'TCI state group ID 1' field and so on. A Pi field may indicate whether a corresponding (e.g., i-th) TCI codepoint has multiple TCI state groups or a single TCI state group. For example, the values of the P fields may be configured as follows:

Value 0 may indicate that i-th TCI codepoint includes both a DL (e.g., possibly including joint) TCI state group and a UL TCI group pair.

Value 1 may indicate that i-th TCI codepoint includes only one TCI group (DL, UL, or joint).

As discussed above, a D/U field (e.g., of 1-bit per row) may indicate whether the TCI state group ID in the same octet corresponds to a DL or UL list. Further, the TCI state group ID may indicate the TCI state group index, e.g., from the list corresponding to the D/U field.

The message illustrated in FIG. 9 may provide sufficient flexibility to selectively associate i-th TCI codepoint with one or two TCI state groups as follows:

Case 1: One DL TCI state group or UL TCI state group only may be associated with the codepoint. The associated Pi field may be set to '1' and the 'DX' field may to be 'D' or 'U'. The exact DL or UL TCI state group index may be indicated by the corresponding 'TCI state group ID' field.

Case 2: One DL TCI state group and one UL TCI state group may be associated with the codepoint. The associated Pi field may be set to '0'. The exact DL and UL TCI state group index values may be indicated by the corresponding 'TCI state group ID' fields (e.g., the i-th and i+1th fields).

As another possibility, a MAC-CE may be enhanced (e.g., relative to a Rel-17 unified TCI activation/Deactivation MAC-CE) by increasing the number of 'Pi' fields from 8 to $2^M$. FIG. 14 illustrates an example of such a MAC-CE with M=4, according to some embodiments. As shown, the P fields may range from P1 to P16, in this example. Each Pi field may correspond to a TCI codepoint, thus this example may be used in association with increasing a number of TCI codepoints from 8 (e.g., as in Rel-17) to 16 (e.g., and correspondingly increasing the size of TCI field in DCI from 3 to 4 (e.g., M) bits.

As another possibility, a TRP-specific (or more generally, a characteristic-specific) message may be introduced to activate DL or UL TCI States for a particular TRP (or lists associated with the characteristic). FIG. 16 illustrates an example of a TRP-specific MAC CE, according to some embodiments. As shown, the new MAC-CE may be identified by a MAC subheader with a dedicated LCID. The MAC-CE may have a variable size including the following fields. Serving cell ID/DL BWP ID/UL BWP ID may be as discussed above with respect to other figures. TRP ID may indicates the identity of the TRP ID for which this message is applied. The Pi fields may each indicate whether a corresponding TCI codepoint has multiple TCI states or a single TCI states. For example, value 0 may indicate that i-th TCI codepoint includes both a DL (e.g., or joint) TCI state and a UL TCI state. In some embodiments, the indicated TCI states may be the i-th and i+1th TCI states listed in the MAC-CE. In some embodiments, the indicated TCI states may be the i-th DL TCI state listed in the MAC-CE and the i-th UL TCI state listed in the MAC-CE. Value 1 may indicate that the i-th TCI codepoint includes only one TCI state (e.g., DL, joint, or UL). The D/U fields may indicate whether the TCI state ID in the same octet is for downlink or uplink TCI state list with the indicated TRP ID. TCI state ID may indicate the TCI state index of the corresponding TCI state list associated with indicated TRP ID.

Further, it will be appreciated that TRP-specific is one example of characteristic-specific messages for TCI state activation/deactivation. The MAC-CE of FIG. 16 may be adjusted to include an identifier of a different characteristic (e.g., in place of TRP ID) as desired. For example, TRP ID may be replaced with an ID of a resource set or resource set pool (e.g., CORESET ID, CORESETPoolIndex, SSS ID, SSSPoolIndex, etc.).

Thus, any number of characteristic-specific messages may be used to activate and/or deactivate TCI states for the characteristic. For instance, if a TCI state is deactivated for a first value of a characteristic (e.g., a first CORESET), it may remain active for a different value of the characteristic (e.g., a second CORESET), etc.

As another possibility, direction-specific messaging may be used to activate and/or deactivate TCI from one or more lists. For example, as noted above a UE may be configured with zero or more common lists of TCI states for multiple TCI states and/or zero or more characteristic-specific lists of TCI states. Some, all, or none of these lists may be direction-specific (e.g., may only include DL or UL TCI states, optionally with joint TCI states included with one direction, e.g., DL). Some, all, or none of these lists may not be direction-specific (e.g., TCI states of multiple directions may be included on any list). Thus, it may be efficient to use messaging to activate/deactivate TCI states of one direction together, e.g., using one message for UL states and a different message for DL states. Again, joint states may be included with one direction, e.g., DL, if desired. Different lists of TCI states may be identified with a direction and a list ID.

For example, a MAC-CE may be used which associates DL TCI states from one or more lists to TCI codepoints (e.g., in DL DCI formats such as 1_1 or 1_2). Relative to a Rel-17 unified TCI state activation/deactivation MAC-CE, such a MAC-CE may be modified with a D/U field indicating that the TCI states listed may refer to TCI state useable for DL (e.g., joint states may or may not be included, in various embodiments). FIG. 24 illustrates an example of a message for DL TCI states, according to some embodiments. As shown, 1 bit, e.g., in a first octet, may be used for the D/U field, e.g., to indicate DL. In the case that two or more DL TCI state lists are used, the 1-bit 'DX' field in each row (e.g., in the Rel-17 MAC-CE) may be repurposed to indicate a 'list ID' for the TCI state ID indicated in that row, e.g., as a list ID field, as shown. In some embodiments, if more than two DL TCI state lists are used, the D/U field may be extended with one or more extra bits, e.g., as needed to accommodate the number of bits of DL list IDs. If only one DL list is used, the list ID field may be omitted, according to some embodiments. The MAC-CE may include a DL BWP ID. Similar to some of the examples discussed above, a plurality of P fields may be included, e.g., indicating the number of the listed TCI states associated with a corresponding codepoint in DCI. In some embodiments, each Pi field may be 1 bit, e.g., indicating that the codepoint is associated with one or two of the listed TCI states (e.g., state is the i and i+1th positions). In some embodiments, each Pi field may be 2 or more bits.

Similarly, a MAC-CE may be used which associates UL TCI states from one or more lists to TCI codepoints (e.g., in UL DCI formats such as 0_1 or 0_2). Relative to a Rel-17 unified TCI state activation/deactivation MAC-CE, such a MAC-CE may be modified with a D/U field indicating that the TCI states listed may refer to TCI state useable for UL (e.g., joint states may or may not be included, in various embodiments). FIG. 25 illustrates an example of a message for UL TCI states, according to some embodiments. As shown, 1 bit, e.g., in a first octet, may be used for the D/U field, e.g., to indicate UL. In the case that two or more UL TCI state lists are used, the 1-bit 'DX' field in each row (e.g., in the Rel-17 MAC-CE) may be repurposed to indicate a 'list ID' for the TCI state ID indicated in that row, e.g., as a list ID field, as shown. In some embodiments, if more than two UL TCI state lists are used, the list ID field may be extended with one or more extra bits, e.g., as needed to accommodate the number of bits of UL list IDs. If only one UL list is used, the list ID field may be omitted, according to some embodiments. The MAC-CE may include a UL BWP ID. Similar to some of the examples discussed above, a plurality of P fields may be included, e.g., indicating the number of the listed TCI states associated with a corresponding codepoint in DCI. In some embodiments, each Pi field may be 1 bit, e.g., indicating that the codepoint is associated with one or two of the listed TCI states (e.g., state is the i and i+1th positions). In some embodiments, each Pi field may be 2 or more bits. In the UL case, it will be appreciated that a sounding reference signal (SRS) resource indicator (SRI) field of the DCI may be used to indicate the TCI codepoint (e.g., as further discussed below).

In some embodiments, a TCI state (or group) may be activated (or remain active) based on being included on a relevant list included in such a message and may be deactivated based on being excluded. For example, a MAC-CE may include a list of TCI states or TCI state groups that are active or activated. Any previously active TCI state (or group) may be deactivated if it is not on the list. It will be appreciated that, as noted above, the lists may be specific to a particular direction, TRP, resource set, or other characteristic. Thus, a state or group may be considered deactivated only if it is excluded from a list of an appropriate characteristic. For example, a DL state may not be considered deactivated if it is excluded from a list of UL states, etc. Similarly, it will be appreciated that various of the messages discussed above may be specific to a serving cell and/or BWP. Thus, such messages may activate or deactivate TCI states for only those cells and/or BWPs indicated for the message. In some embodiments, a common cell ID and/or BWP ID may be used to indicate that the message applies to all cells and/or all BWPs (e.g., potentially limited to any particular, TRP, direction, characteristic, etc. otherwise indicated in the message). Moreover, any of the messages (e.g., MAC-CEs) discussed above may be used to activate and/or deactivate unified TCI states.

The UE may receive the indication of the TCI state activation and/or deactivation.

The UE and the network may (e.g., each, individually) set TCI codepoints (508), according to some embodiments. For example, the UE may determine one or more TCI states (e.g., and/or TCI state groups) to associate with each codepoint of a plurality of TCI codepoints. The determination may be based on the activation/deactivation messaging in 505/506. Similarly, the network may determine the TCI state(s) associated with each codepoint for communication with the UE. Codepoints may be determined for UL and DL communications. In other words, the UE and network may each determine which TCI state(s) to use for a communication for which the network indicates a particular codepoint, e.g., in a DL or UL DCI message. Thus, the UE and network may each determine an association between the various TCI codepoints (e.g., which may be subsequently indicated in control channel messaging such as DCI) and the active TCI states (or groups thereof) as indicated in 505/506.

For example, the network and UE may set TCI states for up to 8 DL TCI codepoints and up to 8 UL TCI codepoints, according to some embodiments. In some embodiments, additional TCI codepoints may be set. For example, $2^M$ UL codepoints may be set and $2^M$ DL codepoints may be set.

As noted above, in some embodiments, DL codepoints may include joint TCI states. In other words, the DL codepoints may indicate states that are useable for DL, while the UL codepoints may be UL only TCI states. In other embodiments, the reverse relation may be used, e.g., UL codepoints may include joint TCI states while DL codepoints include DL codepoints only.

The TCI codepoints may indicate various possible TCI state(s) or combinations of states that the UE and network may use to communicate in sDCI mTRP mode. For example, using the TCI codepoints, one DCI message may indicate the TCI state(s) for each of multiple TRPs.

The network may schedule a first communication with the UE (510), according to some embodiments. The first communication may be a UL and/or DL communication. The first communication may be or include data, control information, reference signals, and/or other forms of communication.

The network may select one or more TCI state(s) for the first communication (512), according to some embodiments. For example, the network may select one or more DL or joint TCI state(s) for any DL portion of the communication and/or select one or more UL or joint TCI state(s) for any UL portion of the communication. The TCI state(s) may be associated with one or more TRP, BWP, resource set (or resource set pool), serving cell, etc.

The network may transmit one or more control channel message(s) to the UE (514), according to some embodiments. The control channel message(s) may schedule the first communication and indicate the TCI states(s) for the first communication. For example, the control channel message(s) may be or include DCI messages indicating a TCI codepoint associated with the TCI state(s) for the first communication. One or more DCI messages may be used, as desired. For example, the same DCI message may be used to both schedule the communication and to indicate the TCI codepoint, or separate messages may be used. DCI formats 1_1 or 1_2 may be used to indicate the TCI codepoint (e.g., in a TCI field) for DL communication. Similarly, DCI formats 0_1 and/or 0_2 may be used to indicate the TCI codepoint (e.g., in an SRI field) for UL communication. In either direction, the DCI may be transmitted according to mode 1 (e.g., with data scheduling in the same message as the TCI codepoint) or mode 2 (e.g., without data scheduling in the same message as the TCI codepoint). Other modes and/or DCI formats may be used as desired.

In some embodiments, DCI formats as in Rel. 17 may be used. In other embodiments, DCI formats may be modified as discussed below.

As one possibility, a size of a TCI or SRI field in DCI may be increased from 3 bits to M bits, e.g., M=4. This change in DCI format may be used with messages setting M codepoints (e.g., such as a MAC-CE similar to that illustrated in FIG. 14 and discussed above).

For example, according to mode 1, for a DL communication, DCI of format 1_1 or 1_2 with data scheduling, the TCI field may be directly increased from 3-bit to M-bit and may result in a larger DCI size. Further, this increase in size of the TCI field may increase the number of possible TCI codepoints (e.g., which may be set as discussed above) and thus the flexibility for the network to schedule communications with different TCI states for different TRPs.

FIG. 10 illustrates a DCI with a 3-bit TCI field, according to some embodiments. As shown, the TCI field may be at the beginning of the message. The TCI field may indicate an (e.g., 3-bit) TCI codepoint. Thus, the TCI field may indicate one of 8 possible TCI codepoints. The TCI field may be followed by one or more other fields, e.g., scheduling a DL data transmission using the TCI state(s) indicated by the TCI codepoint in the TCI field. The DCI may further include cyclic redundancy check (CRC), according to some embodiments.

FIG. 11 illustrates a DCI with a 4-bit TCI field, according to some embodiments. The M-bit TCI field may indicate one of $2^M$ (e.g., 16, if M=4) possible TCI codepoints. The TCI field may be followed by one or more other fields, e.g., scheduling a DL data transmission using the TCI state(s) indicated by the TCI codepoint in the TCI field.

Similarly, according to mode 2, for DL communication, DCI of format 1_1 or 1_2 without data scheduling, the size of the TCI field may be increased.

FIG. 12 illustrates a Rel-17, DCI format 1_1/1_2 for TCI indication without data scheduling, according to some embodiments. As shown, one or more fields may be reserved. For example, the reserved field(s) may include predefined value(s), including '2-bit RV', '5-bit MCS', '1-bit NDI', FDRA field, etc.

In order to increase the size of the TCI field, one or more of the reserved bits (e.g., M–3 bits) may be repurposed and used (e.g., as most significant bits (MSB)) in the TCI field. FIG. 13 illustrates an example in which M–3=1 bit is subtracted from the reserved field(s) and added to the TCI field to result in a (e.g., M=4) 4-bit TCI field, according to some embodiments. As shown, the 4-bit TCI field may be at the beginning of the message.

It will be appreciated that similar modifications may be made to the SRI field of DCI of formats 0_1 or 0_2 (or other formats, as desired) for increasing the number of TCI codepoints that may be used in association with a UL communication.

With the increased size of the TCI and/or SRI fields, the network may be able to activate up to 4 TCI states (e.g., selected from 16 codepoints as in FIG. 14) using 2 DCI messages. For example, one DCI may be used to indicate one UL codepoint (e.g., corresponding to up to 2 UL TCI states) and another DCI may be used to indicate a DL codepoint (e.g., corresponding to 1-2 DL TCI states).

As another possibility, one or more additional TCI field may be added to DCI, e.g., to indicate two or more TCI codepoints in a single message.

FIG. 17 illustrates a DCI message (e.g., according to format 1_1 or 1_2, among various possibilities) with an additional TCI field, according to some embodiments. As shown, TCI fields 1710 and 1720 may each include 3 bits and may each indicate a TCI codepoint. For example, field 1710 may indicate a codepoint for a first TRP (e.g., TRP ID=0) and field 1720 may indicate a codepoint for a second TRP (e.g., TRP ID=1). Among various possibilities, this form of DCI may be useful for indicating DL TCI states when one or more DL TCI state lists are configured (e.g., as in FIG. 15) and/or TCI states from such lists are activated (e.g., according to a message similar to FIG. 16, among various possibilities). FIG. 17 illustrates a DCI which may include data scheduling, e.g., on PDSCH according to mode 1.

FIG. 18 illustrates a DCI message according to formats 1_1 or 1_2 without data scheduling, according to some embodiments. This may be an example of a mode 2 DCI. As shown, a single TCI field 1810 may be included.

FIG. 19 illustrates a DCI message according to formats 1_1 or 1_2 without data scheduling and modified to include a second TCI field, according to some embodiments. As shown, TCI fields 1910 and 1920 may each indicate a TCI codepoint (e.g., of 3 bits each). For example, field 1910 may indicate a codepoint for a first TRP (e.g., TRP ID=0) and field 1920 may indicate a codepoint for a second TRP (e.g., TRP ID=1). In the illustrated example, the second TCI field 1920 may be placed following the other fields of Rel. 17 DCI (e.g., compare to FIG. 18). However, it will be appreciated that the additional TCI field(s) may be placed in different positions. For example, field 1920 may follow field 1910 and the other fields may follow field 1920.

In the examples of FIGS. 17 and 19, it will be appreciated that more than two TCI fields may be included, as desired. According to these formats, one or two TCI states may be provided for each of multiple TRPs. For example, a first TCI field may indicate one or two TCI states (e.g., one UL state and one DL state) for a first TRP, a second TCI field may indicate TCI state(s) for a second TRP, a third TCI field may indicate TCI state(s) for a third TRP, etc.

As another possibility, a TRP ID field may be added to indicate a TRP for which a TCI codepoint should be applied. FIG. 20 illustrates a DCI with a TRP ID field, according to some embodiments. As shown, TCI field 2010 may apply for communications with the TRP indicated in TRP ID field 2012.

Further, it will be appreciated that although FIG. 20 is illustrated with a TRP ID field, alternative ID fields may be used as desired. For example, an identifier of any characteristic may be used, such as resource set, resource set pool, BWP, etc. may be used in DCI. Multiple such fields may be added, e.g., further specifying for what resources/situations the TCI codepoint in the corresponding TCI field is to be applied, according to some embodiments. For example, a resource set ID field may indicate a CORESET, CORESET-PoolIndex, SSS, or SSSPoolIndex for which a TCI codepoint is applied. In some embodiments, such a resource set ID field may be explicitly included in the DCI (e.g., in place of a TRP ID field, or in addition to such a field).

Although various of the example DCI messages illustrated in the figures and discussed above are described in terms of DCI formats (e.g., 1_1 and/or 1_2) used for DL communications, it will be appreciated that similar adjustments/modifications may be applied to DCI formats (e.g., 0_1 and/or 0_2) used for UL communications, e.g., with or without scheduling data.

Further, it will be appreciated that aspects of the example DCI formats discussed above may be combined in various ways. For example, increased TCI field sizes (e.g., for or more bits to indicate one of more than 8 codepoints) may be used in DCI containing more than one TCI field and/or in DCI including a TRP-ID and/or other characteristic ID field. Similarly, TRP-ID and/or other characteristic ID fields may be used in DCI with multiple TCI fields. For instance, each TCI field may have a corresponding resource set ID field, according to some embodiments.

In various embodiments, different DCI messages may be transmitted on different component carriers or at different occasions on a same component carrier (CC), among various possibilities. For example, one DCI for UL may be transmitted on one CC and another DCI for DL may be transmitted on another CC or at a different occasion.

It will be appreciated that any of the control channel messages may both indicate TCI and schedule UL and/or DL communication (e.g., may include a UL and/or DL grant). Alternatively, separate control channel messages may be used for providing the grants/scheduling and the TCI indications.

The UE may receive the control channel message(s).

The UE and the network may set the TCI state(s) for the first communication (516), according to some embodiments. For example, the UE may determine the TCI state(s) indicated by the network for the communication according to the control channel message(s) received in 514. The UE may determine the TCI state(s) based on the codepoint(s) indicated in the control channel (e.g., DCI) message(s). For example, the UE may determine which TCI state(s) are associated with the codepoint(s) in the control channel messages based on an association between TCI states and TCI codepoints (e.g., as determined in 508).

In some embodiments, the determination of the TCI state(s) may include determining a starting point in the subset of active TCI states (or groups) for selecting one or more TCI states (or groups). The starting point may be based on the value of the relevant TCI codepoint. For example, if the value of a codepoint is i (e.g., expressed as a decimal value rather than a binary value for convenience), then the starting point may be the i-th position in the list of active TCI states or groups determined in 508. Further, a number of TCI states or groups selected (e.g., beginning from the starting point) may be determined based on a value of any Pi field associated with the TCI codepoint (e.g., the i-th field in the P fields), if a plurality of P fields is included in the activation message(s) in 506.

In some embodiments, the determination of TCI state(s) may be based on explicit indications. For example, some DCI message may explicitly indicate the TRP ID for which the codepoint(s) is applied.

Figure 23:
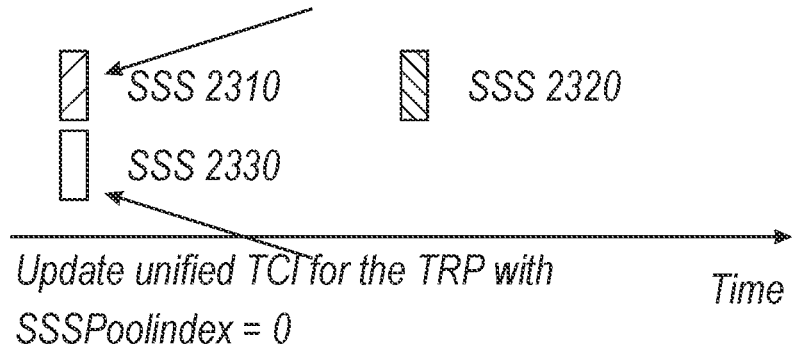

In some embodiments, the determination of TCI state(s) may be based in part on implicit indications. For example, the UE may determine that a TCI codepoint is to be applied to a resource set (e.g., or resource set pool) on which the control channel message is received. For example, if a resource set (or pool) is configured with a set of active TCI states or groups (e.g., in 505-508), the UE may determine that a DCI message received on that resource set (or pool) may include a TCI codepoint (or codepoints) to be applied to that resource set (or pool). FIG. 23 illustrates an example of implicit indication with SSS pools, according to some embodiments. As shown, SSS pool 0 may include SSS 2310 and 2320. SSS pool 1 may include SSS 2330. At a first time, first DCI may be transmitted/received on SSS 2310 and a second DCI may be transmitted/received on SSS 2330. In response to these DCIs, the UE may update the TCI for the SSS pool 0 (e.g., which may correspond to a first TRP) according to the first DCI and may update the TCI for the SSS pool 1 (e.g., which may correspond to a second TRP) according to the second DCI. At a second time, the UE may receive a third DCI on SSS 2320 and, in response, may update the TCI for the SSS pool 0 according to the third DCI. The first and third DCIs may each lead to the UE updating the TCI for all SSSs of the SSS pool 0. For instance, after the first DCI, the TCI for SSS 910 and 920 may both be updated according to the TCI codepoint of the first DCI. Then, after the third DCI, they may both be updated again, e.g., according to the TCI codepoint of the third DCI. It will be appreciated that similar procedures may be applied to CORESET pools. When the TCI of any CORESET of a CORESET pool is updated, the update may be applied to all CORESETs of the pool and all SSSs of each of the CORESETs of the pool, according to some embodiments.

The UE may tune its antenna(s) and/or other receive and/or transmit circuitry according to the TCI state(s) indicated (implicitly and/or explicitly) by the network. Similarly, the network (e.g., TRP(s)) may tune corresponding antenna(s) and circuitry according to the TCI state(s).

The UE and the network may perform the first communication (518), according to some embodiments. For example, the UE and network may exchange data, control information, reference signals, etc. via one or more TRP according to the TCI states indicated in the control channel messages. For example, the first communication may be an mTRP communication using a combination of TCI states indicated in a single DCI.

The first communication may include UL and/or DL communication. The first communication may include communicating with multiple TRPs at the same time (e.g., according to time division and/or frequency division multiplexing). For example, referring to FIG. 6, the UE and network may communicate according to 4 or more TCI states simultaneously (e.g., UL and DL with each of two or more TRPs). In other words, one or more TCI states may be used with each of one or more TRPs.

Thus, at least according to some embodiments, the method of FIG. 5 may be used to provide a framework according to which a UE and network may select a TCI state (e.g., of multiple active TCI states which may be associated with multiple TRPs) for control channel monitoring and reception, and thus to assist the network to effectively and efficiently schedule and perform wireless communications with the UE, at least in some instances.

Although in some embodiments discussed above, joint TCI states may be listed with DL TCI states (e.g., and treated as DL TCI states in some respects), it will be appreciated that in other embodiments joint TCI states may be listed with and treated as UL TCI states in similar respects.

It will be appreciated that any of these steps may be repeated any number of times (e.g., as a UE moves, etc.). Any or all of 503-504 may not be repeated as often as 505-508, according to some embodiments. Similarly, any or all of 505-508 may not be repeated as often as 510-518, according to some embodiments. In other words, the TCI state list(s) may be updated (e.g., 503, 504) less frequently than the set of active TCI states may be modified (e.g., 505-508) and/or the set of active TCI states may be modified less frequently than a particular set of TCI state(s) may be selected and used for communication (e.g., 510-518), according to some embodiments.

In the following further exemplary embodiments are provided.

One set of embodiments may include a method, by a user equipment (UE). The method may include receiving, from a cellular network, configuration of a first list of transmission control indication (TCI) states associated with a plurality of transmission and reception points (TRPs), the first list of TCI states comprising at least four downlink or bi-directional TCI states; receiving, from the cellular network, a first message indicating a first plurality of TCI states of the first list of TCI states, the first message comprising a first plurality of fields, wherein respective fields of the first plurality of fields indicate respective numbers of TCI states of the first plurality of TCI states associated with respective TCI codepoints; receiving, from the cellular network, a second message indicating a value of a first TCI codepoint; based on the value of first TCI codepoint and a first field of the first plurality of fields corresponding to the first TCI codepoint: determining a number of TCI states associated with the value of the first TCI codepoint based on the first field; and selecting, a first subset of TCI states for a downlink communication, the first subset of TCI states including the number of TCI states associated with the value of the first TCI codepoint; and receiving, from the cellular network, the downlink communication according to the second message, said receiving comprising: receiving, from a first TRP of the plurality of TRPs using a first TCI state of the first subset of TCI states; and receiving, from a second TRP of the plurality of TRPs using a second TCI state of the first subset of TCI states.

In some embodiments, the configuration of the first list of TCI states is received via radio resource control (RRC) signaling; the first message comprises a media access control (MAC) control element (MAC-CE); and the second message comprises a downlink control information (DCI) message.

In some embodiments the number of TCI states associated with the first TCI codepoint are selected from the first plurality of TCI states in order of TCI state identifiers (IDs).

In some embodiments, the method may further comprise: determining a starting position for the selection based on a value of the first TCI codepoint.

In some embodiments, the first message further comprises a second plurality of fields comprising TCI state identifiers (IDs) and a third plurality of fields associated with the second plurality of fields, respective fields of the third plurality of fields comprising respective indicators of whether respective TCI state IDs of respective fields of the second plurality of fields are: 1) uplink only; or 2) downlink only or joint downlink and uplink.

In some embodiments, the method may further comprise: receiving, from the cellular network, configuration of a second list of TCI states associated with the plurality of TRPs, the second list of TCI states comprising only uplink TCI states.

In some embodiments, the number of TCI states associated with the first TCI codepoint are selected from the first plurality of TCI states and the second list of TCI states, wherein: if a respective field of the third plurality of fields indicates that a respective field of the second plurality of fields is a respective TCI state ID for uplink only, then a TCI state with the respective TCI state ID for uplink only is selected from the second list of TCI states; or if the respective field of the third plurality of fields indicates that the respective field of the second plurality of fields is a respective TCI state ID for downlink only or joint downlink and uplink, then a TCI state with the respective TCI state ID for downlink only or joint downlink and uplink is selected from the first plurality of TCI states.

In some embodiments, respective fields of the first plurality of fields comprise K bits, wherein K is greater than or equal to 2.

In some embodiments, the first message further comprises a first D/U field indicating that the respective TCI codepoints refer to the first list.

In some embodiments, the method may further comprise: receiving, from the cellular network, configuration of a second list of TCI states associated with the plurality of TRPs, the second list of TCI states comprising uplink only TCI states.

In some embodiments, the method may further comprise: receiving, from the cellular network, a third message indicting a second plurality of TCI states of the second list of TCI states, the third message comprising: a fourth plurality of fields, wherein respective fields of the fourth plurality of fields indicate respective numbers of TCI states of the second list of TCI states associated with second respective TCI codepoints; and a second D/U field indicating that the second respective TCI codepoints refer to the second list.

In some embodiments, the second message comprises a downlink control information (DCI) message of format 0_1 or format 0_2.

In some embodiments, the method may further comprise: receiving, from the cellular network, a fourth message indicating a second TCI codepoint, the fourth message comprising a DCI message of format 0_1 or format 0_2 with the second TCI codepoint indicated in a sounding reference signal (SRS) resource indicator (SRI) field;

In some embodiments, the method may further comprise: based on the second TCI codepoint and a fourth field of the fourth plurality of fields corresponding to the second TCI codepoint: determining a number of TCI states associated with the second TCI codepoint based on the fourth field; and selecting, a second subset of TCI states for an uplink communication, the second subset of TCI states including the number of TCI states associated with the second TCI codepoint.

In some embodiments, the method may further comprise: transmitting, to the cellular network, the uplink communication according to the second message, said transmitting comprising: transmitting, to the first TRP using a third TCI state of the second subset of TCI states; and transmitting, to the second TRP using a fourth TCI state of the second subset of TCI states.

In some embodiments, the fourth message comprises an uplink grant scheduling the uplink communication.

In some embodiments, the method may further comprise: receiving a fifth message, separate from the fourth message, comprising an uplink grant scheduling the uplink communication.

In some embodiments, the first D/U field comprises 1 bit.

In some embodiments, the second message comprises a downlink grant scheduling the downlink communication.

In some embodiments, the method may further comprise: receiving a third message, separate from the second message, comprising a downlink grant scheduling the downlink communication.

One set of embodiments may include a method, by a user equipment (UE). The method may include receiving, from a cellular network, configuration of a plurality of transmission control indication (TCI) states associated with a plurality of transmission and reception points (TRPs); receiving, from the cellular network, configuration of a plurality of TCI state groups, respective TCI state groups of the plurality of TCI state groups comprising multiple TCI states of the plurality of TCI states; receiving, from the cellular network, a first message indicating a subset of the plurality of TCI state groups; determining, based on the first message, an association between respective TCI codepoints and respective TCI state groups of the subset of the plurality of TCI state groups; receiving, from the cellular network, a second message indicating a first TCI codepoint; determining, based on the first TCI codepoint and the association between respective TCI codepoints and respective TCI state groups of the subset of the plurality of TCI state groups, a first TCI state group; and communicating with the cellular network via the plurality of TRPs using multiple TCI states of the first TCI state group.

In some embodiments, the configuration of the plurality of TCI states is received via radio resource control (RRC) signaling.

In some embodiments, the first message comprises a media access control (MAC) control element (MAC-CE); and the second message comprises a downlink control information (DCI) message.

In some embodiments, the configuration of the plurality of TCI state groups is received via RRC signaling.

In some embodiments, the first message comprises a variable size media access control (MAC) control element (MAC-CE) comprising a variable number of TCI state groups.

In some embodiments, the variable number of TCI state groups is less than or equal to 8. In some embodiments, the first message does not include a plurality of 1-bit fields, P.

In some embodiments, receiving the configuration of the plurality of TCI states comprises: receiving a first list of downlink only and/or joint downlink and uplink TCI states; and receiving a second list of uplink only TCI states.

In some embodiments, respective TCI state groups of the plurality of TCI state groups comprise TCI states either: from only the first list; or from only the second list.

In some embodiments, the first message comprises a plurality of 1-bit fields, P, wherein respective 1-bit fields, Pi, can be one of two values; and a first value of a 1-bit field, Pi, indicates that an i-th TCI codepoint is associated with only one TCI state group.

In some embodiments, a second value of the 1-bit field, Pi, indicates that the i-th TCI codepoint is associated with both: a first TCI state group comprising TCI states from only the first list; and a second TCI state group comprising TCI states from only the second list.

In some embodiments, the first message comprises a second plurality of 1-bit fields, wherein according to the 1-bit field Pi, the i-th TCI codepoint is associated with only one TCI state group, and according to a corresponding 1-bit field of the second plurality of 1-bit fields; and the corresponding 1-bit field of the second plurality of 1-bit fields takes one of: a first value indicating that the i-th TCI codepoint is associated with a TCI state group of the first list; or a second value indicating that the i-th TCI codepoint is associated with a TCI state group of the second list.

In some embodiments, the first message indicates an order of the subset of the plurality of TCI state groups; the method further comprises determining a first starting position in the order based on the first TCI codepoint; and an association between the first TCI codepoint and the first TCI state group comprises one of: if a value of a 1-bit field, Pi, associated with the first TCI codepoint is the first value, then the first TCI codepoint is associated with a TCI state group at the first starting position only; or if the value of the 1-bit field, Pi, is the second value, then the first TCI codepoint is associated with the TCI state group at the first starting position and a TCI state group in a position immediately following the first starting position.

In some embodiments, the second message comprises a downlink grant scheduling a downlink communication.

In some embodiments, the communicating with the cellular network includes receiving the downlink communication.

In some embodiments, the method may further comprise: receiving a third message, separate from the second message, comprising a downlink grant scheduling a downlink communication.

In some embodiments, the communicating with the cellular network includes receiving the downlink communication.

One set of embodiments may include a method, by a user equipment (UE). The method may include receiving, from a cellular network, configuration of a plurality of transmission control indication (TCI) states associated with a plurality of transmission and reception points (TRPs); receiving, from the cellular network, a first message: indicating a subset of the plurality of TCI states; and comprising a plurality of 1-bit fields, P, the plurality of 1-bit fields, P, comprising 2M 1-bit fields, wherein M is greater than 3; determining, based on the first message, an association between respective TCI codepoints and respective TCI states of the subset of the plurality of TCI states; receiving, from the cellular network, a second message indicating a first TCI codepoint; determining, based on the first TCI codepoint and the association between respective TCI codepoints and respective TCI states: a first TCI state; and a second TCI state; communicating with the cellular network via the plurality of TRPs using the first TCI state and the second TCI state.

In some embodiments, the second message comprises a first field of M bits indicating the first TCI codepoint.

In some embodiments, the second message comprises a second field scheduling data.

In some embodiments, the second message does not include a second field scheduling data; and relative to a previous form of downlink control information (DCI) message format 1_1 or 1_2 that does not include data scheduling, the second message includes at least one additional bit in a TCI field.

In some embodiments, relative to the previous form of DCI message format 1_1 or 1_2 that does not include data scheduling, the second message: includes at least one less reserved bit; and includes a same total number of bits.

In some embodiments, the at least one reserved bit: comprises M−3 bits; and is used as a most significant bit of the first field.

In some embodiments, respective 1-bit fields, Pi, of the plurality of 1-bit fields, P, can be one of the following two values: a first value of a 1-bit field, Pi, which indicates that an i-th TCI codepoint is associated with one TCI state; and a second value of the 1-bit field, Pi, which indicates that the i-th TCI codepoint is associated with two TCI states.

In some embodiments, the first message indicates an order of the subset of the plurality of TCI states; and the method further comprises determining a first starting position in the order based on a value of the first TCI codepoint.

In some embodiments, a value of a first 1-bit fields, Pi, of the plurality of 1-bit fields, P, associated with the first TCI codepoint is the second value; the first TCI state comprises a TCI state in the starting position in the order; and the second TCI state comprises a TCI state immediately subsequent to the starting position in the order.

In some embodiments, the first message comprises a media access control (MAC) control element (MAC-CE).

In some embodiments, the second message comprises a downlink control information (DCI) message.

In some embodiments, the configuration of the plurality of TCI states is received via radio resource control (RRC) signaling.

In some embodiments, the method may further comprise: receiving, from the cellular network, a third message indicating a second TCI codepoint; determining, based on the second TCI codepoint and the association between respective TCI codepoints and respective TCI states: a third TCI state; and a fourth TCI state; communicating with the cellular network via the plurality of TRPs using the third TCI state and the fourth TCI state at the same time as the communicating with the cellular network via the plurality of TRPs using the first TCI state and the second TCI state.

In some embodiments, the first TCI state and the second TCI state correspond to a first TRP; and the third TCI state and the fourth TCI state correspond to a second TRP.

In some embodiments, the first TCI state and the third TCI state correspond to a first TRP; and the second TCI state and the fourth TCI state correspond to a second TRP.

In some embodiments, the communicating with the cellular network via the plurality of TRPs using the third TCI state and the fourth TCI state at the same time as the communicating with the cellular network via the plurality of TRPs using the first TCI state and the second TCI state comprises communicating according to at least one of time division multiplexing or frequency division multiplexing.

One set of embodiments may include a method, by a user equipment (UE). The method may include receiving, from a cellular network, configuration of a plurality of transmission control indication (TCI) states associated with a plurality of transmission and reception points (TRPs), the configuration comprising: a first pair of lists, comprising: a first list of TCI states; and a second list TCI states; a second pair of lists, comprising: a third list of TCI states; and a fourth list of TCI states; receiving, from the cellular network, a first message specific to the first pair of lists indicating a first subset of the plurality of TCI states; determining, based on the first message, a first association between respective TCI codepoints and respective TCI states according to the first pair of lists; receiving, from the cellular network, a second message indicating a first TCI codepoint; selecting, based on the first TCI codepoint and the first association between respective TCI codepoints and respective TCI states: a first TCI state from the first list; and a second TCI state from the second list; communicating with the cellular network via the first TRP using the first TCI state and the second TCI state.

In some embodiments, the first list and the third list consist of downlink only and/or joint downlink and uplink TCI states; the second list and the fourth list consist of uplink only TCI states; the first pair of lists is for a first TRP of the plurality of TRPs and is identified with a TRP index of the first TRP; the second pair of lists is for a second TRP of the plurality of TRPs and is identified with a TRP index of the second TRP; and the first message includes the TRP index of the first TRP.

In some embodiments, the second message is specific to the first TRP and includes the TRP index of the first TRP.

In some embodiments, the second message further indicates a second TCI codepoint, the method further comprising: receiving, from the cellular network, a third message specific to the second pair of lists indicating a second subset of the plurality of TCI states and including an index of the second TRP; determining, based on the third message, a second association between respective TCI codepoints and respective TCI states according to the second pair of lists; selecting, based on the second TCI codepoint and the second association between respective TCI codepoints and respective TCI states: a third TCI state from the third list; and a fourth TCI state from the fourth list; and communicating with the cellular network via the second TRP using the third TCI state and the fourth TCI state.

In some embodiments, the second message: schedules data; indicates the first TCI codepoint in a first TCI field; and indicates the second TCI codepoint in a second TCI field immediately subsequent to the first TCI field.

In some embodiments, the second message: does not schedule data; indicates the first TCI codepoint in a first TCI field; and indicates the second TCI codepoint in a second TCI field, wherein at least one field is between the first TCI field and the second TCI field.

In some embodiments, the first list and the third list consist of downlink only and/or joint downlink and uplink TCI states; the second list and the fourth list consist of uplink only TCI states; the first pair of lists is identified with a resource set pool index of a first resource set pool of a plurality of resource set pools; the second pair of lists is identified with a resource set pool index of a second resource set pool of the plurality of resource set pools; and the first message includes the resource set pool index of the first resource set pool.

In some embodiments, the method may further comprise: receiving, from the cellular network, a third message specific to the second pair of lists indicating a second subset of the plurality of TCI states; and determining, based on the third message, a second association between respective TCI codepoints and respective TCI states according to the second pair of lists.

In some embodiments, respective resource set pools of the plurality of resource set pools comprise control resource set (CORESET) pools and the first resource set pool comprises a first CORESET pool; the second message is received on resources associated with a first CORESET of the first CORESET pool; the method further comprises determining, based on the second message being received on resources associated with the first CORESET set, that the first TCI codepoint is indicated for use with the first CORESET pool; the selecting the first TCI state from the first list is further based on the determination that the first TCI codepoint is indicated for use with the first CORESET pool; and the selecting the second TCI state from the second list is further based on the determination that the first TCI codepoint is indicated for use with the first CORESET pool.

In some embodiments, the method may further comprise: receiving search space set (SSS) configuration, the SSS configuration indicating: an association of a first SSS with the first pair of lists; and an association of a second SSS with the second pair of lists.

In some embodiments, the second message is received on resources associated with the first SS.

In some embodiments, the method may further comprise: determining, based on the second message being received on resources associated with the first SSS, that the first TCI codepoint is indicated for use according to the first association between respective TCI codepoints and respective TCI states.

In some embodiments, the selecting the first TCI state from the first list is further based on the determination that the first TCI codepoint is indicated for use according to the first association between respective TCI codepoints and respective TCI states; and the selecting the second TCI state from the second list is further based on the determination that the first TCI codepoint is indicated for use according to the first association between respective TCI codepoints and respective TCI states.

In some embodiments, the association of the first SSS with the first pair of lists; and the association of the second SSS with the second pair of lists are indicated via one of: a TRP index; an SSS pool index; or a control resource set (CORESET) pool index.

In some embodiments, the method may further comprise: receiving, from the cellular network, a third message specific to the second pair of lists indicating a second subset of the plurality of TCI states; determining, based on the third message, a second association between respective TCI codepoints and respective TCI states according to the second pair of lists; receiving, from the cellular network on resources associated with the second SSS, a fourth message indicating a second TCI codepoint; determining, based on the fourth message being received on resources associated with the second SSS, that the second TCI codepoint is indicated for use according to the second association between respective TCI codepoints and respective TCI states; selecting, based on: (a) the second TCI codepoint, (b) the determination that the second TCI codepoint is indicated for use according to the second association between respective TCI codepoints and respective TCI states, and (c) the second association between respective TCI codepoints and respective TCI states: a third TCI state from the third list; and a fourth TCI state from the fourth list; communicating with the cellular network via the second TRP using the third TCI state and the fourth TCI state.

In some embodiments, the first list and the second list consist of downlink only and/or joint downlink and uplink TCI states; the first list and the second list are associated with first and second list identifiers (list IDs), respectively; the third list and the fourth list consist of uplink only TCI states; the first message comprises a first field indicating that the first message is associated with downlink only and/or joint downlink and uplink TCI states; the first message comprises respective list ID fields indicating respective list IDs for respective TCI states of the first subset of the plurality of TCI states; and the first association is based on the first field and the respective list ID for the respective TCI states of the first subset of the plurality of TCI states.

In some embodiments, the first message further comprises a plurality of 1-bit fields indicating respective numbers of TCI states associated with respective TCI codepoints.

In some embodiments, the configuration of the plurality of TCI states is received via radio resource control (RRC) signaling; the first message comprises a media access control (MAC) control element (MAC-CE); and the second message comprises a downlink control information (DCI) message.

In some embodiments, said selecting the first TCI state is based on a position of the first TCI state corresponding to the first TCI codepoint according to the first association between respective TCI codepoints and respective TCI states.

In some embodiments, said selecting the second TCI state is based on a position of the being immediately subsequent to the position of the first TCI state according to the first association between respective TCI codepoints and respective TCI states.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a user equipment (UE):
receiving, from a cellular network, configuration of a plurality of transmission control indication (TCI) states associated with a plurality of transmission and reception points (TRPs), the configuration comprising:
a first pair of lists, comprising:
a first list of TCI states; and
a second list of TCI states;
a second pair of lists, comprising:
a third list of TCI states; and
a fourth list of TCI states;
receiving, from the cellular network, a first message specific to the first pair of lists indicating a first subset of the plurality of TCI states;
determining, based on the first message, a first association between respective TCI codepoints and respective TCI states according to the first pair of lists;
receiving, from the cellular network, a second message indicating a first TCI codepoint;
selecting, based on the first TCI codepoint and the first association between respective TCI codepoints and respective TCI states:
a first TCI state from the first list; and
a second TCI state from the second list; and
communicating with the cellular network via the plurality of TRPs using the first TCI state and the second TCI state.

2. The method of claim 1, wherein:
the first list and the third list consist of downlink only and/or joint downlink and uplink TCI states;
the second list and the fourth list consist of uplink only TCI states;
the first pair of lists is for a first TRP of the plurality of TRPs and is identified with a TRP index of the first TRP;
the second pair of lists is for a second TRP of the plurality of TRPs and is identified with a TRP index of the second TRP; and
the first message includes the TRP index of the first TRP.

3. The method of claim 2, wherein the second message is specific to the first TRP and includes the TRP index of the first TRP.

4. The method of claim 2, wherein the second message further indicates a second TCI codepoint, the method further comprising:

receiving, from the cellular network, a third message specific to the second pair of lists indicating a second subset of the plurality of TCI states and including an index of the second TRP;
determining, based on the third message, a second association between respective TCI codepoints and respective TCI states according to the second pair of lists;
selecting, based on the second TCI codepoint and the second association between respective TCI codepoints and respective TCI states:
a third TCI state from the third list; and
a fourth TCI state from the fourth list; and
communicating with the cellular network via the second TRP using the third TCI state and the fourth TCI state.

5. The method of claim 4, wherein the second message:
schedules data;
indicates the first TCI codepoint in a first TCI field; and
indicates the second TCI codepoint in a second TCI field immediately subsequent to the first TCI field.

6. The method of claim 4, wherein the second message:
does not schedule data;
indicates the first TCI codepoint in a first TCI field; and
indicates the second TCI codepoint in a second TCI field, wherein at least one field is between the first TCI field and the second TCI field.

7. The method of claim 1, wherein:
the first list and the third list consist of downlink only and/or joint downlink and uplink TCI states;
the second list and the fourth list consist of uplink only TCI states;
the first pair of lists is identified with a resource set pool index of a first resource set pool of a plurality of resource set pools;
the second pair of lists is identified with a resource set pool index of a second resource set pool of the plurality of resource set pools; and
the first message includes the resource set pool index of the first resource set pool.

8. The method of claim 7, wherein the method further comprises:
receiving, from the cellular network, a third message specific to the second pair of lists indicating a second subset of the plurality of TCI states; and
determining, based on the third message, a second association between respective TCI codepoints and respective TCI states according to the second pair of lists.

9. The method of claim 7, wherein:
respective resource set pools of the plurality of resource set pools comprise control resource set (CORESET) pools and the first resource set pool comprises a first CORESET pool;
the second message is received on resources associated with a first CORESET of the first CORESET pool;
the method further comprises determining, based on the second message being received on resources associated with the first CORESET set, that the first TCI codepoint is indicated for use with the first CORESET pool;
the selecting the first TCI state from the first list is further based on the determination that the first TCI codepoint is indicated for use with the first CORESET pool; and
the selecting the second TCI state from the second list is further based on the determination that the first TCI codepoint is indicated for use with the first CORESET pool.

10. The method of claim 1, wherein:
the method further comprises receiving search space set (SSS) configuration, the SSS configuration indicating:

an association of a first SSS with the first pair of lists; and an association of a second SSS with the second pair of lists;

the second message is received on resources associated with the first SS;

the method further comprises determining, based on the second message being received on resources associated with the first SSS, that the first TCI codepoint is indicated for use according to the first association between respective TCI codepoints and respective TCI states;

the selecting the first TCI state from the first list is further based on the determination that the first TCI codepoint is indicated for use according to the first association between respective TCI codepoints and respective TCI states; and the selecting the second TCI state from the second list is further based on the determination that the first TCI codepoint is indicated for use according to the first association between respective TCI codepoints and respective TCI states.

11. The method of claim 10, wherein the association of the first SSS with the first pair of lists; and the association of the second SSS with the second pair of lists are indicated via one of:

a TRP index;

an SSS pool index; or a control resource set (CORESET) pool index.

12. The method of claim 10, further comprising:

receiving, from the cellular network, a third message specific to the second pair of lists indicating a second subset of the plurality of TCI states;

determining, based on the third message, a second association between respective TCI codepoints and respective TCI states according to the second pair of lists;

receiving, from the cellular network on resources associated with the second SSS, a fourth message indicating a second TCI codepoint;

determining, based on the fourth message being received on resources associated with the second SSS, that the second TCI codepoint is indicated for use according to the second association between respective TCI codepoints and respective TCI states;

selecting, based on: (a) the second TCI codepoint, (b) the determination that the second TCI codepoint is indicated for use according to the second association between respective TCI codepoints and respective TCI states, and (c) the second association between respective TCI codepoints and respective TCI states:

a third TCI state from the third list; and a fourth TCI state from the fourth list; and communicating with the cellular network via the plurality of TRPs using the third TCI state and the fourth TCI state.

13. The method of claim 1, wherein:

the first list and the second list consist of downlink only and/or joint downlink and uplink TCI states;

the first list and the second list are associated with first and second list identifiers (list IDs), respectively;

the third list and the fourth list consist of uplink only TCI states;

the first message comprises a first field indicating that the first message is associated with downlink only and/or joint downlink and uplink TCI states;

the first message comprises respective list ID fields indicating respective list IDs for respective TCI states of the first subset of the plurality of TCI states; and the first association is based on the first field and the respective list ID for the respective TCI states of the first subset of the plurality of TCI states.

14. The method of claim 13, wherein the first message further comprises a plurality of 1-bit fields indicating respective numbers of TCI states associated with respective TCI codepoints.

15. The method of claim 1, wherein:

the configuration of the plurality of TCI states is received via radio resource control (RRC) signaling;

the first message comprises a media access control (MAC) control element (MAC-CE); and the second message comprises a downlink control information (DCI) message.

16. The method of claim 1, wherein said selecting the first TCI state is based on a position of the first TCI state corresponding to the first TCI codepoint according to the first association between respective TCI codepoints and respective TCI states.

17. The method of claim 16, wherein said selecting the second TCI state is based on a position of the second TCI state being immediately subsequent to the position of the first TCI state according to the first association between respective TCI codepoints and respective TCI states.

18. An apparatus, comprising:

a processor configured to cause a user equipment (UE) to:

receive, from a cellular network, configuration of a plurality of transmission control indication (TCI) states associated with a plurality of transmission and reception points (TRPs), the configuration comprising:

a first pair of lists, comprising:

a first list of TCI states; and a second list TCI states;

a second pair of lists, comprising:

a third list of TCI states; and a fourth list of TCI states;

receive, from the cellular network, a first message specific to the first pair of lists indicating a first subset of the plurality of TCI states;

determine, based on the first message, a first association between respective TCI codepoints and respective TCI states according to the first pair of lists;

receive, from the cellular network, a second message indicating a first TCI codepoint;

select, based on the first TCI codepoint and the first association between respective TCI codepoints and respective TCI states:

a first TCI state from the first list; and a second TCI state from the second list; and communicate with the cellular network via the plurality of TRPs using the first TCI state and the second TCI state.

19. The apparatus of claim 18, further comprising a radio operably coupled to the processor.

20. A method, comprising:

at a cellular network:

transmitting, to a user equipment (UE), configuration of a plurality of transmission control indication (TCI) states associated with a plurality of transmission and reception points (TRPs), the configuration comprising:

a first pair of lists, comprising:

a first list of TCI states; and a second list TCI states;
a second pair of lists, comprising:
  a third list of TCI states; and
  a fourth list of TCI states;
transmitting, to the UE, a first message specific to the first pair of lists indicating a first subset of the plurality of TCI states;
determine a first association between respective TCI codepoints and respective TCI states according to the first pair of lists;
transmitting, to the UE, a second message indicating a first TCI codepoint;
select, based on the first TCI codepoint and the first association between respective TCI codepoints and respective TCI states:
  a first TCI state from the first list; and
  a second TCI state from the second list; and
communicate with the UE via the plurality of TRPs using the first TCI state and the second TCI state.

* * * * *